(12) United States Patent
Moore et al.

(10) Patent No.: US 11,984,655 B2
(45) Date of Patent: May 14, 2024

(54) WIDEBAND RADOME DESIGN

(71) Applicant: SAINT-GOBAIN PERFORMANCE PLASTICS CORPORATION, Solon, OH (US)

(72) Inventors: Levi Moore, Kent, OH (US); Eric R. Oswald, Hudson, OH (US); David Winfield Stresing, Kent, OH (US); Steven Kleine, Vienna, OH (US); Alexander Kieckhafer, Lakewood, OH (US); Megan Utter, Uniontown, OH (US); Sarah E. Taggart, Stow, OH (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 86 days.

(21) Appl. No.: 16/712,138

(22) Filed: Dec. 12, 2019

(65) Prior Publication Data
US 2020/0212556 A1 Jul. 2, 2020

Related U.S. Application Data

(60) Provisional application No. 62/785,480, filed on Dec. 27, 2018.

(51) Int. Cl.
*H01Q 1/42* (2006.01)
*B32B 5/02* (2006.01)
*B32B 5/18* (2006.01)
*B32B 5/24* (2006.01)
*B32B 5/26* (2006.01)
(Continued)

(52) U.S. Cl.
CPC .............. *H01Q 1/421* (2013.01); *B32B 5/02* (2013.01); *B32B 5/18* (2013.01); *B32B 5/245* (2013.01);
(Continued)

(58) Field of Classification Search
CPC .......... H01Q 1/421; H01Q 1/422; B32B 5/18; B32B 5/26; B32B 5/245; B32B 7/025; B32B 2307/204
See application file for complete search history.

(56) References Cited

U.S. PATENT DOCUMENTS 5,017,939 A 5/1991 Wu
5,408,244 A 4/1995 Mackenzie
(Continued)

FOREIGN PATENT DOCUMENTS

CN 102593604 A 7/2012
CN 106853707 A 6/2017
(Continued)

OTHER PUBLICATIONS

International Search Report and Written Opinion for PCT/US2019/065947, mailed Apr. 14, 2020, 10 pages.

*Primary Examiner* — Hai Vo
(74) *Attorney, Agent, or Firm* — Abel Schillinger, LLP; Adrian Lawrence

(57) ABSTRACT

A radome structure may include an inner tuning layer component and a laminate component overlying the inner tuning layer component. The inner tuning layer component may include a thermoset foam or a thermoplastic foam. The laminate component may include a first fiber reinforced dielectric layer, a second fiber reinforced dielectric layer overlying the first fiber reinforced dielectric layer, and a third fiber reinforced dielectric layer overlying the second fiber reinforced dielectric layer. The first fiber reinforced dielectric layer may include a first low dielectric constant material. The second fiber reinforced dielectric layer may include a first high dielectric constant material. The third fiber reinforced dielectric layer may include a second low dielectric constant material.

9 Claims, 5 Drawing Sheets

(51) Int. Cl.
    *B32B 5/32*         (2006.01)
    *B32B 7/025*       (2019.01)

(52) U.S. Cl.
    CPC ............... *B32B 5/26* (2013.01); *B32B 5/32* (2013.01); *B32B 7/025* (2019.01); *H01Q 1/422* (2013.01); *B32B 2250/05* (2013.01); *B32B 2266/0214* (2013.01); *B32B 2266/0228* (2013.01); *B32B 2266/0235* (2013.01); *B32B 2266/08* (2013.01); *B32B 2307/204* (2013.01); *B32B 2307/72* (2013.01)

(56) References Cited

U.S. PATENT DOCUMENTS

| | | | |
|---|---|---|---|
| 5,707,723 A | 1/1998 | Harrison et al. | |
| 7,420,523 B1 * | 9/2008 | Ziolkowski | H01Q 1/422 |
| | | | 343/872 |
| 8,917,220 B2 | 12/2014 | Ziolkowski et al. | |
| 9,099,782 B2 | 8/2015 | Ziolkowski | |
| 9,537,207 B2 | 1/2017 | Keen et al. | |
| 2013/0321236 A1 | 12/2013 | Ziolkowski | |
| 2016/0380345 A1 * | 12/2016 | Kolak | H01Q 1/422 |
| | | | 343/872 |

FOREIGN PATENT DOCUMENTS

| | | |
|---|---|---|
| CN | 207098058 U | 3/2018 |
| EP | 2747202 A1 | 6/2014 |
| JP | S54-083741 A | 7/1979 |
| RU | 3660 U1 | 2/1997 |
| RU | 160053 U1 | 2/2016 |
| RU | 161080 U1 | 4/2016 |
| WO | 2018005392 A1 | 1/2018 |

* cited by examiner

WIDEBAND RADOME DESIGN

CROSS-REFERENCE TO RELATED APPLICATION(S)

This application claims priority under 35 U.S.C. § 119(e) to U.S. Provisional Patent Application No. 62/785,480, entitled "WIDEBAND RADOME DESIGN," by Levi MOORE et al., filed Dec. 27, 2018, which is assigned to the current assignee hereof and is incorporated herein by reference in its entirety.

FIELD OF THE DISCLOSURE

The present disclosure relates to radome structural designs and, in particular, to radome structural designs optimized for transmission of broadband electromagnetic waves.

BACKGROUND

Generally, microwave antennas are covered with radomes to protect the antennas from harmful weather conditions and to ensure the antenna's continuous and precise operation. Radomes can be in the form of thin wall radomes, solid wall radomes, and sandwich radomes. Thin wall radomes have a thickness typically less than 1/16 inch and may be supported using increased air pressure or using a supporting frame. Solid wall radomes are typically made of a heavier solid laminate, and sandwich radomes include a low dielectric core material sandwiched between thin inner and outer laminate layers. The core material is typically a plastic foam structure or a honeycomb structure.

Regardless of the materials used to form radomes, the radome structure generally degrades the signal strength of electromagnetic waves transmitted from the antennas through the radome. This is particularly true in regards to broadband transmissions. Accordingly, radomes with improved structural designs that have the ability for adjustment and optimization to minimize electromagnetic degradation over broadband electromagnetic wave transmissions are desired.

SUMMARY

According to a first aspect, a radome structure may include an inner tuning layer component and a laminate component overlying the inner tuning layer component. The inner tuning layer component may include a thermoset foam or a thermoplastic foam. The thermoset foam may have a density of at least about 300 $kg/m^3$ and not greater than about 1000 $kg/m^3$. The thermoset foam may further have a dielectric constant of at least about 1.5 and not greater than about 3. The thermoplastic foam may have a density of not greater than about 300 $kg/m^3$. The thermoplastic foam may further have a dielectric constant of not greater than about 1.5. The laminate component may include a first fiber reinforced dielectric layer, a second fiber reinforced dielectric layer overlying the first fiber reinforced dielectric layer, and a third fiber reinforced dielectric layer overlying the second fiber reinforced dielectric layer. The first fiber reinforced dielectric layer may include a first low dielectric constant material. The second fiber reinforced dielectric layer may include a first high dielectric constant material. The third fiber reinforced dielectric layer may include a second low dielectric constant material.

According to another aspect, a radome structure may include an inner tuning layer component and a laminate component overlying the inner tuning layer component. The inner tuning layer component may include syntactic foam, a plastic closed cell foam, or combinations thereof. The laminate component may include a first fiber reinforced dielectric layer, a second fiber reinforced dielectric layer overlying the first fiber reinforced dielectric layer, and a third fiber reinforced dielectric layer overlying the second fiber reinforced dielectric layer. The first fiber reinforced dielectric layer may include a first low dielectric constant material. The second fiber reinforced dielectric layer may include a first high dielectric constant material. The third fiber reinforced dielectric layer may include a second low dielectric constant material.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a radome structure that includes an inner tuning layer component and a laminate component overlying the inner tuning layer component. The combination of the laminate component and the inner tuning layer component is designed to optimize co-polarization and cross-polarization over a broadband spectrum (i.e., a frequency range of from about 10 GHz to about 31 GHz).

Figure 1A:
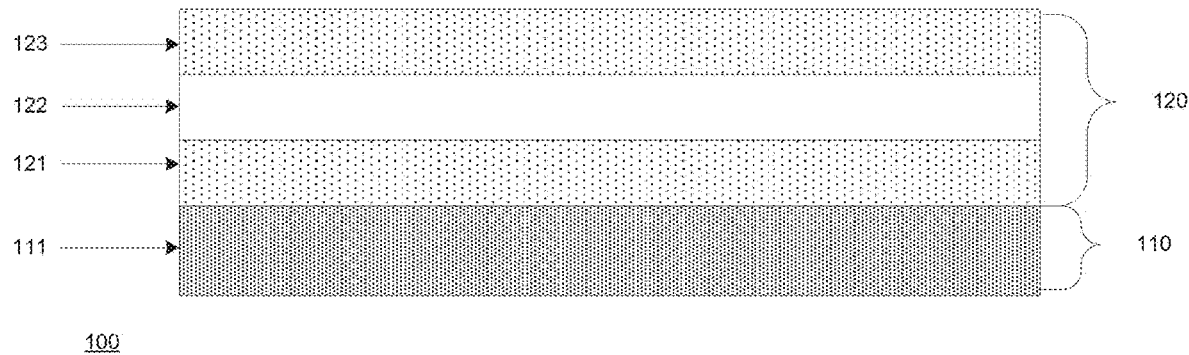
FIGS. 1a & 1b include illustrations of a radome structure according to embodiments described herein.

For purposes of illustration, FIG. 1a includes an illustration of a radome structure 100 according to embodiments described herein. As shown in FIG. 1a, a radome structure 100 may include an inner tuning layer component 110 and a laminate component 120 overlying the inner tuning layer component 110. According to particular embodiments, and as further shown in FIG. 1a, the inner tuning layer component 110 may include a first inner tuning layer 111. According to still other embodiments, and as also shown in FIG. 1a, the laminate component 120 may include a first fiber reinforced dielectric layer 121, a second fiber reinforced dielectric layer 122 overlying the first fiber reinforced dielectric layer 121, and a third fiber reinforced dielectric layer 123 overlying the second fiber reinforced dielectric layer 122. According to certain embodiments, the first fiber reinforced dielectric layer 121 may include a first low dielectric constant material. According to still other embodiments, the second fiber reinforced dielectric layer 122 may include a first high dielectric constant material. According to yet other embodiments, the third fiber reinforced dielectric layer 123 may include a second low dielectric constant material.

According to particular embodiments, the inner tuning layer component 110 may include a thermoset foam or a thermoplastic foam.

According to certain embodiments, where the inner tuning layer component 110 includes a thermoset foam, the thermoset foam may have a particular density. For example, the thermoset foam of the inner tuning layer component 110 may have a density of at least about 300 kg/m$^3$, such as, at least about 310 kg/m$^3$ or at least about 320 kg/m$^3$ or at least about 330 kg/m$^3$ or at least about 340 kg/m$^3$ or at least about 350 kg/m$^3$ or at least about 360 kg/m$^3$ or at least about 370 kg/m$^3$ or at least about 380 kg/m$^3$ or at least about 390 kg/m$^3$ or at least about 400 kg/m$^3$ or at least about 410 kg/m$^3$ or at least about 420 kg/m$^3$ or at least about 430 kg/m$^3$ or at least about 440 kg/m$^3$ or at least about 450 kg/m$^3$ or at least about 460 kg/m$^3$ or at least about 470 kg/m$^3$ or at least about 480 kg/m$^3$ or at least about 490 kg/m$^3$ or even at least about 500 kg/m$^3$. According to still other embodiments, the thermoset foam of the inner tuning layer component 110 may have a density of not greater than about 1000 kg/m$^3$, such as, not greater than about 990 kg/m$^3$ or not greater than about 980 kg/m$^3$ or not greater than about 970 kg/m$^3$ or not greater than about 960 kg/m$^3$ or not greater than about 950 kg/m$^3$ or not greater than about 940 kg/m$^3$ or not greater than about 930 kg/m$^3$ or not greater than about 920 kg/m$^3$ or not greater than about 910 kg/m$^3$ or not greater than about 900 kg/m$^3$ or not greater than about 890 kg/m$^3$ or not greater than about 880 kg/m$^3$ or not greater than about 870 kg/m$^3$ or not greater than about 860 kg/m$^3$ or not greater than about 850 kg/m$^3$ or not greater than about 840 kg/m$^3$ or not greater than about 830 kg/m$^3$ or not greater than about 820 kg/m$^3$ or not greater than about 810 kg/m$^3$ or even not greater than about 800 kg/m$^3$. It will be appreciated that the density of the thermoset foam of the inner tuning layer component 110 may be within a range between any of the minimum and maximum values noted above. It will be further appreciated that the density of the thermoset foam of the inner tuning layer component 110 may be any value between any of the minimum and maximum values noted above.

According to yet other embodiments, where the inner tuning layer component 110 includes a thermoset foam, the thermoset foam may have a particular dielectric constant. For example, the thermoset foam of the inner tuning layer component 110 may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, the thermoset foam of the inner tuning layer component 110 may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of the thermoset foam of the inner tuning layer component 110 may be within a range between any of the minimum and maximum values noted above. It will be further appreciated that the dielectric constant of the thermoset foam of the inner tuning layer component 110 may be any value between any of the minimum and maximum values noted above.

According to certain embodiments, where the inner tuning layer component 110 includes a thermoplastic foam, the thermoplastic foam may have a particular density. For example, the thermoplastic foam of the inner tuning layer component 110 may have a density of not greater than about 300 kg/m$^3$, such as, not greater than about 295 kg/m$^3$ or not greater than about 290 kg/m$^3$ or not greater than about 285 kg/m$^3$ or not greater than about 280 kg/m$^3$ or not greater than about 275 kg/m$^3$ or not greater than about 270 kg/m$^3$ or not greater than about 265 kg/m$^3$ or not greater than about 260 kg/m$^3$ or not greater than about 255 kg/m$^3$ or not greater than about 250 kg/m$^3$ or not greater than about 245 kg/m$^3$ or not greater than about 240 kg/m$^3$ or not greater than about 235 kg/m$^3$ or not greater than about 230 kg/m$^3$ or not greater than about 225 kg/m$^3$ or not greater than about 220 kg/m$^3$ or not greater than about 215 kg/m$^3$ or not greater than about 210 kg/m$^3$ or not greater than about 205 kg/m$^3$ or not greater than about 200 kg/m$^3$. According to still other embodiments, the thermoplastic foam of the inner tuning layer component 110 may have a density of at least about 1 kg/m$^3$, such as, at least about 10 kg/m$^3$ or at least about 15 kg/m$^3$ or at least about 20 kg/m$^3$ or at least about 25 kg/m$^3$ or at least about 30 kg/m$^3$ or at least about 35 kg/m$^3$ or at least about 40 kg/m$^3$ or at least about 45 kg/m$^3$ or at least about 50 kg/m$^3$. It will be appreciated that the density of the thermoplastic foam of the inner tuning layer component 110 may be within a range between any of the minimum and maximum values noted above. It will be further appreciated that the density of the thermoplastic foam of the inner tuning layer component 110 may be any value between any of the minimum and maximum values noted above.

According to yet other embodiments, where the inner tuning layer component 110 includes a thermoplastic foam, the thermoplastic foam may have a particular dielectric constant. For example, the thermoplastic foam of the inner tuning layer component 110 may have a dielectric constant of not greater than about 1.5 or not greater than about 1.45 or not greater than about 1.4 or not greater than about 1.35 or not greater than about 1.30 or not greater than about 1.25 or not greater than about 1.20 or not greater than about 1.15 or not greater than about 1.10 or not greater than about 1.05 or even not greater than about 1.00. According to still other embodiments, the thermoplastic foam of the inner tuning layer component 110 may have a dielectric constant of at least about 0.01, such as, at least about 0.05 or at least about 0.10 or at least about 0.15 or at least about 0.20 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the thermoplastic foam of the inner tuning layer component 110 may be within a range between any of the minimum and maximum values noted above. It will be further appreciated that the dielectric constant of the thermoplastic foam of the inner tuning layer component 110 may be any value between any of the minimum and maximum values noted above.

According to still other embodiments, the inner tuning layer component 110 may include syntactic foam. According to still other embodiments, the inner tuning layer component 110 may include a plastic closed cell foam. According to still other embodiments, the inner tuning layer component 110 may include a combination of a syntactic foam, and a plastic closed cell foam. According to still other embodiments, the inner tuning layer component 110 may include a syntactic foam, a plastic closed cell foam, a polymethacrylimide (PMI), a polycarbonate (PC), a polyetherimide (PEI), a polyvinyl chloride (PVC), acrylonitrile butadiene styrene (ABS), styrofoam, or combinations thereof.

According to yet other embodiments, the inner tuning layer component 110 may have a particular thickness. For example, the inner tuning layer component 110 may have a thickness of at least about 0.1 mm, such as, at least about 0.5 mm or at least about 1.0 mm or at least about 1.5 mm or at least about 2.0 mm or at least about 2.5 mm or at least about 3.0 mm or at least about 3.5 mm or at least about 4.0 mm or at least about 4.5 mm or at least about 5.0 mm. According to yet other embodiments, the inner tuning layer 100 may have a thickness of not greater than about 12.5 mm, such as, not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 or even not greater than about 6.0 mm. It will be appreciated that the thickness of the inner tuning layer component 110 may be within a range between any of the minimum and maximum values noted above. It will be further appreciated that the thickness of the inner tuning layer component 110 may be any value between any of the minimum and maximum values noted above.

According to particular embodiments, the inner tuning layer component 110 may be a single layer of material. According to yet other embodiments and as shown in FIG. 1a, the single layer of material may be a single first inner tuning layer 111.

According to particular embodiments, the first inner tuning layer 111 may include a thermoset foam or a thermoplastic foam.

According to certain embodiments, where the first inner tuning layer 111 includes a thermoset foam, the thermoset foam may have a particular density. For example, the thermoset foam of the first inner tuning layer 111 may have a density of at least about 300 $kg/m^3$, such as, at least about 310 $kg/m^3$ or at least about 320 $kg/m^3$ or at least about 330 $kg/m^3$ or at least about 340 $kg/m^3$ or at least about 350 $kg/m^3$ or at least about 360 $kg/m^3$ or at least about 370 $kg/m^3$ or at least about 380 $kg/m^3$ or at least about 390 $kg/m^3$ or at least about 400 $kg/m^3$ or at least about 410 $kg/m^3$ or at least about 420 $kg/m^3$ or at least about 430 $kg/m^3$ or at least about 440 $kg/m^3$ or at least about 450 $kg/m^3$ or at least about 460 $kg/m^3$ or at least about 470 $kg/m^3$ or at least about 480 $kg/m^3$ or at least about 490 $kg/m^3$ or even at least about 500 $kg/m^3$. According to still other embodiments, the thermoset foam of the first inner tuning layer 111 may have a density of not greater than about 1000 $kg/m^3$, such as, not greater than about 990 $kg/m^3$ or not greater than about 980 $kg/m^3$ or not greater than about 970 $kg/m^3$ or not greater than about 960 $kg/m^3$ or not greater than about 950 $kg/m^3$ or not greater than about 940 $kg/m^3$ or not greater than about 930 $kg/m^3$ or not greater than about 920 $kg/m^3$ or not greater than about 910 $kg/m^3$ or not greater than about 900 $kg/m^3$ or not greater than about 890 $kg/m^3$ or not greater than about 880 $kg/m^3$ or not greater than about 870 $kg/m^3$ or not greater than about 860 $kg/m^3$ or not greater than about 850 $kg/m^3$ or not greater than about 840 $kg/m^3$ or not greater than about 830 $kg/m^3$ or not greater than about 820 $kg/m^3$ or not greater than about 810 $kg/m^3$ or even not greater than about 800 $kg/m^3$. It will be appreciated that the density of the thermoset foam of the first inner tuning layer 111 may be within a range between any of the minimum and maximum values noted above. It will be further appreciated that the density of the thermoset foam of the first inner tuning layer 111 may be any value between any of the minimum and maximum values noted above.

According to yet other embodiments, where the first inner tuning layer 111 includes a thermoset foam, the thermoset foam may have a particular dielectric constant. For example, the thermoset foam of the first inner tuning layer 111 may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, the thermoset foam of the first inner tuning layer 111 may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of the thermoset foam of the first inner tuning layer 111 may be within a range between any of the minimum and maximum values noted above. It will be further appreciated that the dielectric constant of the thermoset foam of the first inner tuning layer 111 may be any value between any of the minimum and maximum values noted above.

According to certain embodiments, where the first inner tuning layer 111 includes a thermoplastic foam, the thermoplastic foam may have a particular density. For example, the thermoplastic foam of the first inner tuning layer 111 may have a density of not greater than about 300 kg/m³, such as, not greater than about 295 kg/m³ or not greater than about 290 kg/m³ or not greater than about 285 kg/m³ or not greater than about 280 kg/m³ or not greater than about 275 kg/m³ or not greater than about 270 kg/m³ or not greater than about 265 kg/m³ or not greater than about 260 kg/m³ or not greater than about 255 kg/m³ or not greater than about 250 kg/m³ or not greater than about 245 kg/m³ or not greater than about 240 kg/m³ or not greater than about 235 kg/m³ or not greater than about 230 kg/m³ or not greater than about 225 kg/m³ or not greater than about 220 kg/m³ or not greater than about 215 kg/m³ or not greater than about 210 kg/m³ or not greater than about 205 kg/m³ or not greater than about 200 kg/m³. According to still other embodiments, the thermoplastic foam of the first inner tuning layer 111 may have a density of at least about 1 kg/m³, such as, at least about 10 kg/m³ or at least about 15 kg/m³ or at least about 20 kg/m³ or at least about 25 kg/m³ or at least about 30 kg/m³ or at least about 35 kg/m³ or at least about 40 kg/m³ or at least about 45 kg/m³ or at least about 50 kg/m³. It will be appreciated that the density of the thermoplastic foam of the first inner tuning layer 111 may be within a range between any of the minimum and maximum values noted above. It will be further appreciated that the density of the thermoplastic foam of the first inner tuning layer 111 may be any value between any of the minimum and maximum values noted above.

According to yet other embodiments, where the first inner tuning layer 111 includes a thermoplastic foam, the thermoplastic foam may have a particular dielectric constant. For example, the thermoplastic foam of the first inner tuning layer 111 may have a dielectric constant of not greater than about 1.5 or not greater than about 1.45 or not greater than about 1.4 or not greater than about 1.35 or not greater than about 1.30 or not greater than about 1.25 or not greater than about 1.20 or not greater than about 1.15 or not greater than about 1.10 or not greater than about 1.05 or even not greater than about 1.00. According to still other embodiments, the thermoplastic foam of the first inner tuning layer 111 may have a dielectric constant of at least about 0.01, such as, at least about 0.05 or at least about 0.10 or at least about 0.15 or at least about 0.20 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the thermoplastic foam of the first inner tuning layer 111 may be within a range between any of the minimum and maximum values noted above. It will be further appreciated that the dielectric constant of the thermoplastic foam of the first inner tuning layer 111 may be any value between any of the minimum and maximum values noted above.

According to still other embodiments, the first inner tuning layer component 111 may include syntactic foam. According to still other embodiments, the first inner tuning layer component 111 may include a plastic closed cell foam. According to still other embodiments, the first inner tuning layer component 111 may include a combination of a syntactic foam, and a plastic closed cell foam. According to still other embodiments, the first inner tuning layer component 111 may include a syntactic foam, a plastic closed cell foam, a polymethacrylimide (PMI), a polycarbonate (PC), a polyetherimide (PEI), a polyvinyl chloride (PVC), acrylonitrile butadiene styrene (ABS), styrofoam, or combinations thereof.

According to yet other embodiments, the first inner tuning layer 111 may have a particular thickness. For example, the first inner tuning layer 111 may have a thickness of at least about 0.1 mm, such as, at least about 0.3 mm or at least about 0.5 mm or at least about 0.7 mm or at least about 1.0 mm or at least about 1.3 mm or at least about 1.5 mm or at least about 1.7 mm or at least about 2.0 mm or at least about 2.5 mm or at least about 3.0 mm. According to yet other embodiments, the inner tuning layer 100 may have a thickness of not greater than about 6.25 mm, such as, not greater than about 6.0 mm or not greater than about 5.75 mm or not greater than about 5.5 mm or not greater than about 5.25 mm or not greater than about 5.0 mm or not greater than about 4.75 mm or not greater than about 4.5 mm or not greater than about 4.25 mm or not greater than about 4.0 mm or not greater than about 3.75 mm or even not greater than about 3.5 mm. It will be appreciated that the thickness of the first inner tuning layer 111 may be within a range between any of the minimum and maximum values noted above. It will be further appreciated that the thickness of the first inner tuning layer 111 may be any value between any of the minimum and maximum values noted above.

According to yet other embodiments, the first low dielectric constant material of the first fiber reinforced dielectric layer 121 may have a particular dielectric constant. For example, the first low dielectric constant material may have a dielectric constant of not greater than about 3.5, such as not greater than about 3.45 or not greater than about 3.4 or not greater than about 3.35 or not greater than about 3.3 or not greater than about 3.25 or not greater than about 3.2 or not greater than about 3.15 or not greater than about 3.1 or not greater than about 3.05 or even not greater than about 3.0. According to still other embodiments, the first low dielectric constant material may have a dielectric constant of at least about 1.5, such as at least about 1.55 or at least about 1.6 or at least about 1.65 or at least about 1.7 or at least about 1.75 or at least about 1.8 or at least about 1.85 or at least about 1.9 or at least about 1.95 or even at least about 2.0. It will be appreciated that the dielectric constant of the first low dielectric constant material may be within a range between any of the minimum and maximum values noted above. It will be further appreciated that the dielectric constant of the first low dielectric constant material may be any value between any of the minimum and maximum values noted above.

According to yet other embodiments, the first fiber reinforced dielectric layer 121 may have a particular dielectric constant. For example, the first fiber reinforced dielectric layer 121 may have a dielectric constant of not greater than about 3.5, such as not greater than about 3.45 or not greater than about 3.4 or not greater than about 3.35 or not greater than about 3.3 or not greater than about 3.25 or not greater than about 3.2 or not greater than about 3.15 or not greater than about 3.1 or not greater than about 3.05 or even not greater than about 3.0. According to still other embodiments, the first fiber reinforced dielectric layer 121 may have a dielectric constant of at least about 1.5, such as at least about 1.55 or at least about 1.6 or at least about 1.65 or at least about 1.7 or at least about 1.75 or at least about 1.8 or at least about 1.85 or at least about 1.9 or at least about 1.95 or even at least about 2.0. It will be appreciated that the dielectric constant of the first fiber reinforced dielectric layer 121 may be within a range between any of the minimum and maximum values noted above. It will be further appreciated that the dielectric constant of the first fiber reinforced dielectric layer 121 may be any value between any of the minimum and maximum values noted above.

According to still other embodiments, the first low dielectric constant material of the first fiber reinforced dielectric layer 121 may include polyethylene (PE), polypropylene (PP), polytetrafluoroethylene (PTFE), polyamide (PA) or combinations thereof. According to still other embodiments, the first low dielectric constant material of the first fiber reinforced dielectric layer 121 may include polyethylene (PE) fibers, polypropylene (PP) fibers, polytetrafluoroethylene (PTFE) fibers, polyamide (PA) fibers, or combinations thereof. According to yet other embodiments, the first low dielectric constant material of the first fiber reinforced dielectric layer 121 may include polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

According to still other embodiments, the first fiber reinforced dielectric layer 121 may include polyethylene (PE), polypropylene (PP), polytetrafluoroethylene (PTFE), polyamide (PA) or combinations thereof. According to still other embodiments, the first fiber reinforced dielectric layer 121 may include polyethylene (PE) fibers, polypropylene (PP) fibers, polytetrafluoroethylene (PTFE) fibers, polyamide (PA) fibers, or combinations thereof. According to yet other embodiments, the first fiber reinforced dielectric layer 121 may include polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

According to yet other embodiments, the first fiber reinforced dielectric layer 121 may have a particular thickness. For example, the first fiber reinforced dielectric layer 121 may have a thickness of at least about 0.10 mm, such as at least about 0.11 mm or at least about 0.12 mm or at least about 0.13 mm or at least about 0.14 mm or at least about 0.15 mm or at least about 0.2 mm or at least about 0.3 mm or at least about 0.4 mm or at least about 0.5 mm or at least about 1.0 mm or at least about 1.5 mm or even at least about 2.0 mm. According to still other embodiments, the first fiber reinforced dielectric layer 121 may have a thickness of not greater than about 6.5 mm, such as not greater than about 6.0 mm or not greater than about 5.5 mm or not greater than about 5.0 mm or not greater than about 4.5 or even not greater than about 4.0 mm. It will be appreciated that the thickness of the first fiber reinforced dielectric layer 121 may be within a range between any of the minimum and maximum values noted above. It will be further appreciated that the thickness of the first fiber reinforced dielectric layer 121 may be any value between any of the minimum and maximum values noted above.

According to yet other embodiments, the first high dielectric constant material of the second fiber reinforced dielectric layer 122 may have a particular dielectric constant. For example, the first high dielectric constant material may have a dielectric constant of not greater than about 8, such as not greater than about 8.75 or not greater than about 8.5 or not greater than about 8.25 or not greater than about 8.0 or not greater than about 7.75 or not greater than about 7.5 or not greater than about 7.25 or not greater than about 7.0 or not greater than about 6.75 or not greater than about 6.5 or not greater than about 6.25 or not greater than about 6.0 or not greater than about 5.75 or not greater than about 5.5 or not greater than about 5.25 or not greater than about 5.0. According to still other embodiments, the first high dielectric constant material may have a dielectric constant of at least about 2.5, such as at least about 2.75 or at least about 3.0 or at least about 3.25 or at least about 3.5 or at least about 3.75 or at least about 4.0 or at least about 4.25 or at least about 4.5 or even at least about 4.75. It will be appreciated that the dielectric constant of the first high dielectric constant material may be within a range between any of the minimum and maximum values noted above. It will be further appreciated that the dielectric constant of the first high dielectric constant material may be any value between any of the minimum and maximum values noted above.

According to yet other embodiments, the second fiber reinforced dielectric layer 122 may have a particular dielectric constant. For example, the second fiber reinforced dielectric layer 122 may have a dielectric constant of not greater than about 8, such as not greater than about 8.75 or not greater than about 8.5 or not greater than about 8.25 or not greater than about 8.0 or not greater than about 7.75 or not greater than about 7.5 or not greater than about 7.25 or not greater than about 7.0 or not greater than about 6.75 or not greater than about 6.5 or not greater than about 6.25 or not greater than about 6.0 or not greater than about 5.75 or not greater than about 5.5 or not greater than about 5.25 or not greater than about 5.0. According to still other embodiments, the second fiber reinforced dielectric layer 122 may have a dielectric constant of at least about 2.5, such as at least about 2.75 or at least about 3.0 or at least about 3.25 or at least about 3.5 or at least about 3.75 or at least about 4.0 or at least about 4.25 or at least about 4.5 or even at least about 4.75. It will be appreciated that the second fiber reinforced dielectric layer 122 may be within a range between any of the minimum and maximum values noted above. It will be further appreciated that the second fiber reinforced dielectric layer 122 may be any value between any of the minimum and maximum values noted above.

According to still other embodiments, the first high dielectric constant material of the second fiber reinforced dielectric layer 122 may include glass fibers in a polymer matrix. According to still other embodiments, the first high dielectric constant material of the second fiber reinforced dielectric layer 122 may include glass fibers in a polyester matrix. According to yet other embodiments, the first high dielectric constant material of the second fiber reinforced dielectric layer 122 may include glass fibers in a resin matrix. According to still other embodiments, the first high dielectric constant material of the second fiber reinforced dielectric layer 122 may include glass fibers in a cyanate ester matrix. According to still other embodiments, the first high dielectric constant material of the second fiber reinforced dielectric layer 122 may include any combination of glass fibers in a polymer matrix, glass fibers in a polyester matrix, glass fibers in a resin matrix, and glass fibers in a cyanate ester matrix.

According to still other embodiments, the second fiber reinforced dielectric layer 122 may include glass fibers in a polymer matrix. According to still other embodiments, the second fiber reinforced dielectric layer 122 may include glass fibers in a polyester matrix. According to yet other embodiments, the second fiber reinforced dielectric layer 122 may include glass fibers in a resin matrix. According to still other embodiments, the second fiber reinforced dielectric layer 122 may include glass fibers in a cyanate ester matrix. According to still other embodiments, the second fiber reinforced dielectric layer 122 may include any combination of glass fibers in a polymer matrix, glass fibers in a polyester matrix, glass fibers in a resin matrix, and glass fibers in a cyanate ester matrix.

According to yet other embodiments, the second fiber reinforced dielectric layer 122 may have a particular thickness. For example, the second fiber reinforced dielectric layer 122 may have a thickness of at least about 0.10 mm, such as at least about 0.11 mm or at least about 0.12 mm or at least about 0.13 mm or at least about 0.14 mm or at least about 0.15 mm or at least about 0.2 mm or at least about 0.3 mm or at least about 0.4 mm or at least about 0.5 mm or at least about 1.0 mm or at least about 1.5 mm or even at least about 2.0 mm. According to still other embodiments, the second fiber reinforced dielectric layer 122 may have a thickness of not greater than about 6.5 mm, such as not greater than about 6.0 mm or not greater than about 5.5 mm or not greater than about 5.0 mm or not greater than about 4.5 or even not greater than about 4.0 mm. It will be appreciated that the thickness of the second fiber reinforced dielectric layer 122 may be within a range between any of the minimum and maximum values noted above. It will be further appreciated that the thickness of the second fiber reinforced dielectric layer 122 may be any value between any of the minimum and maximum values noted above.

According to yet other embodiments, the second low dielectric constant material of the third fiber reinforced dielectric layer 123 may have a particular dielectric constant. For example, the second low dielectric constant material may have a dielectric constant of not greater than about 3.5, such as not greater than about 3.45 or not greater than about 3.4 or not greater than about 3.35 or not greater than about 3.3 or not greater than about 3.25 or not greater than about 3.2 or not greater than about 3.15 or not greater than about 3.1 or not greater than about 3.05 or even not greater than about 3.0. According to still other embodiments, the second low dielectric constant material may have a dielectric constant of at least about 1.5, such as at least about 1.55 or at least about 1.6 or at least about 1.65 or at least about 1.7 or at least about 1.75 or at least about 1.8 or at least about 1.85 or at least about 1.9 or at least about 1.95 or even at least about 2.0. It will be appreciated that the dielectric constant of the second low dielectric constant material may be within a range between any of the minimum and maximum values noted above. It will be further appreciated that the dielectric constant of the second low dielectric constant material may be any value between any of the minimum and maximum values noted above.

According to yet other embodiments, the third fiber reinforced dielectric layer 123 may have a particular dielectric constant. For example, the third fiber reinforced dielectric layer 123 may have a dielectric constant of not greater than about 3.5, such as not greater than about 3.45 or not greater than about 3.4 or not greater than about 3.35 or not greater than about 3.3 or not greater than about 3.25 or not greater than about 3.2 or not greater than about 3.15 or not greater than about 3.1 or not greater than about 3.05 or even not greater than about 3.0. According to still other embodiments, the third fiber reinforced dielectric layer 123 may have a dielectric constant of at least about 1.5, such as at least about 1.55 or at least about 1.6 or at least about 1.65 or at least about 1.7 or at least about 1.75 or at least about 1.8 or at least about 1.85 or at least about 1.9 or at least about 1.95 or even at least about 2.0. It will be appreciated that the dielectric constant of the third fiber reinforced dielectric layer 123 may be within a range between any of the minimum and maximum values noted above. It will be further appreciated that the dielectric constant of the third fiber reinforced dielectric layer 123 may be any value between any of the minimum and maximum values noted above.

According to still other embodiments, the second low dielectric constant material of the third fiber reinforced dielectric layer 123 may include polyethylene (PE), polypropylene (PP), polytetrafluoroethylene (PTFE), polyamide (PA) or combinations thereof. According to still other embodiments, the second low dielectric constant material of the third fiber reinforced dielectric layer 123 may include polyethylene (PE) fibers, polypropylene (PP) fibers, polytetrafluoroethylene (PTFE) fibers, polyamide (PA) fibers, or combinations thereof. According to yet other embodiments, the second low dielectric constant material of the third fiber reinforced dielectric layer 123 may include polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

According to still other embodiments, the third fiber reinforced dielectric layer 123 may include polyethylene (PE), polypropylene (PP), polytetrafluoroethylene (PTFE), polyamide (PA) or combinations thereof. According to still other embodiments, the third fiber reinforced dielectric layer 123 may include polyethylene (PE) fibers, polypropylene (PP) fibers, polytetrafluoroethylene (PTFE) fibers, polyamide (PA) fibers, or combinations thereof. According to yet other embodiments, the third fiber reinforced dielectric layer 123 may include polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

According to yet other embodiments, the third fiber reinforced dielectric layer 123 may have a particular thickness. For example, the third fiber reinforced dielectric layer 123 may have a thickness of at least about 0.10 mm, such as at least about 0.11 mm or at least about 0.12 mm or at least about 0.13 mm or at least about 0.14 mm or at least about 0.15 mm or at least about 0.2 mm or at least about 0.3 mm or at least about 0.4 mm or at least about 0.5 mm or at least about 1.0 mm or at least about 1.5 mm or even at least about 2.0 mm. According to still other embodiments, the third fiber reinforced dielectric layer 123 may have a thickness of not greater than about 6.5 mm, such as not greater than about 6.0 mm or not greater than about 5.5 mm or not greater than about 5.0 mm or not greater than about 4.5 or even not greater than about 4.0 mm. It will be appreciated that the thickness of the third fiber reinforced dielectric layer 123 may be within a range between any of the minimum and maximum values noted above. It will be further appreciated that the thickness of the third fiber reinforced dielectric layer 123 may be any value between any of the minimum and maximum values noted above.

Figure 1B:
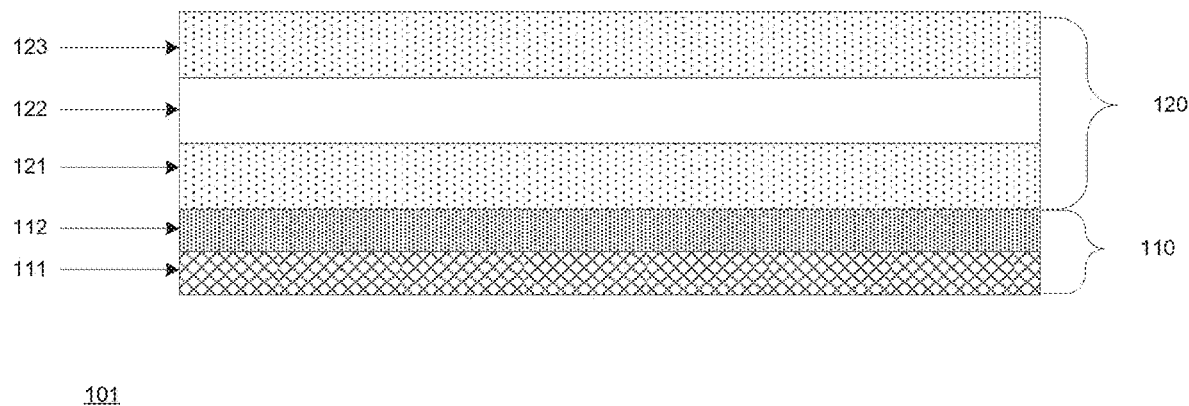

FIG. 1b includes an illustration of an alternative embodiment of a radome structure. For purposes of illustration and as shown in FIG. 1b, a radome structure 101 may include an inner tuning layer component 110 and a laminate component 120 overlying the inner tuning layer component 110. According to particular embodiments, and as further shown in FIG. 1b, the inner tuning layer component 110 may include a first inner tuning layer 111 and a second inner tuning layer 112. According to still other embodiments, and as also shown in FIG. 1a, the laminate component 120 may include a first fiber reinforced dielectric layer 121, a second fiber reinforced dielectric layer 122 overlying the first fiber reinforced dielectric layer 121, and a third fiber reinforced dielectric layer 123 overlying the second fiber reinforced dielectric layer 122. According to certain embodiments, the first fiber reinforced dielectric layer 121 may include a low dielectric constant material. According to still other embodiments, the second fiber reinforced dielectric layer 122 may include a first high dielectric constant material.

According to yet other embodiments, the third fiber reinforced dielectric layer 123 may include a second low dielectric constant material.

It will be appreciated that the radome structure 101 and all components described in reference to the radome structure 101 as shown in FIG. 1b may have any of the characteristics described herein with reference to corresponding components in FIG. 1a. In particular, the characteristics of the radome structure 101, the inner tuning layer component 110, the laminate component 120, the first inner tuning layer 111, the first fiber reinforced dielectric layer 121, the second fiber reinforced dielectric layer 122, and the third fiber reinforced dielectric layer 123 shown in FIG. 1b may have any of the corresponding characteristics described herein in reference to the radome structure 100, the inner tuning layer component 110, the laminate component 120, the first inner tuning layer 111, the first fiber reinforced dielectric layer 121, the second fiber reinforced dielectric layer 122, and the third fiber reinforced dielectric layer 123 shown in FIG. 1a, respectively.

Referring now specifically to FIG. 1b, according to certain embodiments and as shown in FIG. 1b, the second inner tuning layer 112 of the of the inner tuning layer component 110 may located between the first inner tuning layer 111 and the laminate component 120.

According to still other embodiments, the dielectric constant of the first inner tuning layer 111 may be less than a dielectric constant of the second inner tuning layer 112.

According to particular embodiments, the second inner tuning layer 112 may include a thermoset foam or a thermoplastic foam.

According to certain embodiments, where the second inner tuning layer 112 includes a thermoset foam, the thermoset foam may have a particular density. For example, the thermoset foam of the second inner tuning layer 112 may have a density of at least about 300 kg/m$^3$, such as, at least about 310 kg/m$^3$ or at least about 320 kg/m$^3$ or at least about 330 kg/m$^3$ or at least about 340 kg/m$^3$ or at least about 350 kg/m$^3$ or at least about 360 kg/m$^3$ or at least about 370 kg/m$^3$ or at least about 380 kg/m$^3$ or at least about 390 kg/m$^3$ or at least about 400 kg/m$^3$ or at least about 410 kg/m$^3$ or at least about 420 kg/m$^3$ or at least about 430 kg/m$^3$ or at least about 440 kg/m$^3$ or at least about 450 kg/m$^3$ or at least about 460 kg/m$^3$ or at least about 470 kg/m$^3$ or at least about 480 kg/m$^3$ or at least about 490 kg/m$^3$ or even at least about 500 kg/m$^3$. According to still other embodiments, the thermoset foam of the second inner tuning layer 112 may have a density of not greater than about 1000 kg/m$^3$, such as, not greater than about 990 kg/m$^3$ or not greater than about 980 kg/m$^3$ or not greater than about 970 kg/m$^3$ or not greater than about 960 kg/m$^3$ or not greater than about 950 kg/m$^3$ or not greater than about 940 kg/m$^3$ or not greater than about 930 kg/m$^3$ or not greater than about 920 kg/m$^3$ or not greater than about 910 kg/m$^3$ or not greater than about 900 kg/m$^3$ or not greater than about 890 kg/m$^3$ or not greater than about 880 kg/m$^3$ or not greater than about 870 kg/m$^3$ or not greater than about 860 kg/m$^3$ or not greater than about 850 kg/m$^3$ or not greater than about 840 kg/m$^3$ or not greater than about 830 kg/m$^3$ or not greater than about 820 kg/m$^3$ or not greater than about 810 kg/m$^3$ or even not greater than about 800 kg/m$^3$. It will be appreciated that the density of the thermoset foam of the second inner tuning layer 112 may be within a range between any of the minimum and maximum values noted above. It will be further appreciated that the density of the thermoset foam of the second inner tuning layer 112 may be any value between any of the minimum and maximum values noted above.

According to yet other embodiments, where the second inner tuning layer 112 includes a thermoset foam, the thermoset foam may have a particular dielectric constant. For example, the thermoset foam of the second inner tuning layer 112 may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, the thermoset foam of the second inner tuning layer 112 may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of the thermoset foam of the second inner tuning layer 112 may be within a range between any of the minimum and maximum values noted above. It will be further appreciated that the dielectric constant of the thermoset foam of the second inner tuning layer 112 may be any value between any of the minimum and maximum values noted above.

According to certain embodiments, where the second inner tuning layer 112 includes a thermoplastic foam, the thermoplastic foam may have a particular density. For example, the thermoplastic foam of the second inner tuning layer 112 may have a density of not greater than about 300 kg/m$^3$, such as, not greater than about 295 kg/m$^3$ or not greater than about 290 kg/m$^3$ or not greater than about 285 kg/m$^3$ or not greater than about 280 kg/m$^3$ or not greater than about 275 kg/m$^3$ or not greater than about 270 kg/m$^3$ or not greater than about 265 kg/m$^3$ or not greater than about 260 kg/m$^3$ or not greater than about 255 kg/m$^3$ or not greater than about 250 kg/m$^3$ or not greater than about 245 kg/m$^3$ or not greater than about 240 kg/m$^3$ or not greater than about 235 kg/m$^3$ or not greater than about 230 kg/m$^3$ or not greater than about 225 kg/m$^3$ or not greater than about 220 kg/m$^3$ or not greater than about 215 kg/m$^3$ or not greater than about 210 kg/m$^3$ or not greater than about 205 kg/m$^3$ or not greater than about 200 kg/m$^3$. According to still other embodiments, the thermoplastic foam of the second inner tuning layer 112 may have a density of at least about 1 kg/m$^3$, such as, at least about 10 kg/m$^3$ or at least about 15 kg/m$^3$ or at least about 20 kg/m$^3$ or at least about 25 kg/m$^3$ or at least about 30 kg/m$^3$ or at least about 35 kg/m$^3$ or at least about 40 kg/m$^3$ or at least about 45 kg/m$^3$ or at least about 50 kg/m$^3$. It will be appreciated that the density of the thermoplastic foam of the second inner tuning layer 112 may be within a range between any of the minimum and maximum values noted above. It will be further appreciated that the density of the thermoplastic foam of the second inner tuning layer 112 may be any value between any of the minimum and maximum values noted above.

According to yet other embodiments, where the second inner tuning layer 112 includes a thermoplastic foam, the thermoplastic foam may have a particular dielectric constant. For example, the thermoplastic foam of the second inner tuning layer 112 may have a dielectric constant of not greater than about 1.5 or not greater than about 1.45 or not greater than about 1.4 or not greater than about 1.35 or not greater than about 1.30 or not greater than about 1.25 or not greater than about 1.20 or not greater than about 1.15 or not greater than about 1.10 or not greater than about 1.05 or even not greater than about 1.00. According to still other embodiments, the thermoplastic foam of the second inner tuning layer 112 may have a dielectric constant of at least about 0.01, such as, at least about 0.05 or at least about 0.10 or at least about 0.15 or at least about 0.20 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the thermoplastic foam of the second inner tuning layer 112 may be within a range between any of the minimum and maximum values noted above. It will be further appreciated that the dielectric constant of the thermoplastic foam of the second inner tuning layer 112 may be any value between any of the minimum and maximum values noted above.

According to still other embodiments, the second inner tuning layer component 112 may include syntactic foam. According to still other embodiments, the second inner tuning layer component 112 may include a plastic closed cell foam. According to still other embodiments, the second inner tuning layer component 112 may include a combination of a syntactic foam, and a plastic closed cell foam. According to still other embodiments, the second inner tuning layer component 112 may include a syntactic foam, a plastic closed cell foam, a polymethacrylimide (PMI), a polycarbonate (PC), a polyetherimide (PEI), a polyvinyl chloride (PVC), acrylonitrile butadiene styrene (ABS), styrofoam, or combinations thereof.

According to yet other embodiments, the second inner tuning layer 112 may have a particular thickness. For example, the second inner tuning layer 112 may have a thickness of at least about 0.1 mm, such as, at least about 0.3 mm or at least about 0.5 mm or at least about 0.7 mm or at least about 1.0 mm or at least about 1.3 mm or at least about 1.5 mm or at least about 1.7 mm or at least about 2.0 mm or at least about 2.5 mm or at least about 3.0 mm. According to yet other embodiments, the inner tuning layer 100 may have a thickness of not greater than about 6.25 mm, such as, not greater than about 6.0 mm or not greater than about 5.75 mm or not greater than about 5.5 mm or not greater than about 5.25 mm or not greater than about 5.0 mm or not greater than about 4.75 mm or not greater than about 4.5 mm or not greater than about 4.25 mm or not greater than about 4.0 mm or not greater than about 3.75 mm or even not greater than about 3.5 mm. It will be appreciated that the thickness of the second inner tuning layer 112 may be within a range between any of the minimum and maximum values noted above. It will be further appreciated that the thickness of the second inner tuning layer 112 may be any value between any of the minimum and maximum values noted above.

Figure 2A:
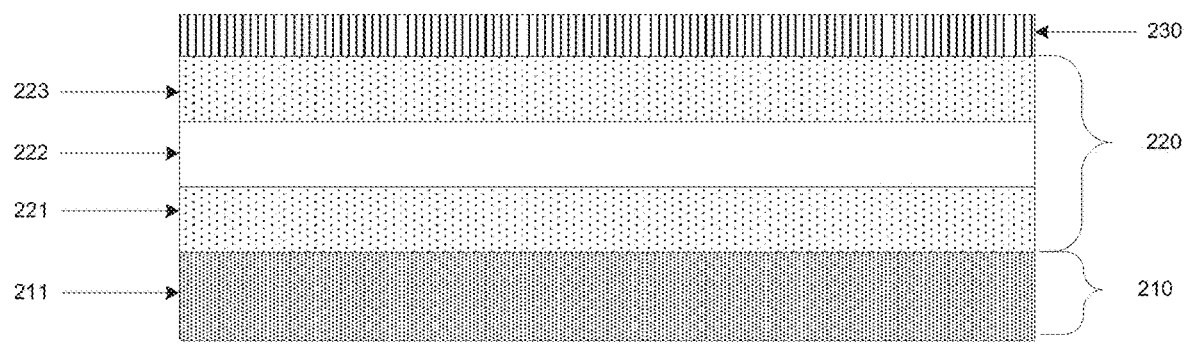
FIGS. 2a & 2b include illustrations of a radome structure according to embodiments described herein.

FIG. 2a includes an illustration of yet another alternative embodiment of a radome structure. For purposes of illustration and as shown in FIG. 2a, a radome structure 200 may include an inner tuning layer component 210, a laminate component 220 overlying the inner tuning layer component 210 and a protection layer 230 overlying the laminate component 220. According to particular embodiments, and as further shown in FIG. 2a, the inner tuning layer component 210 may include a first inner tuning layer 211. According to still other embodiments, and as also shown in FIG. 2a, the laminate component 220 may include a first fiber reinforced dielectric layer 221, a second fiber reinforced dielectric layer 222 overlying the first fiber reinforced dielectric layer 221, and a third fiber reinforced dielectric layer 223 overlying the second fiber reinforced dielectric layer 222. According to certain embodiments, the first fiber reinforced dielectric layer 221 may include a first low dielectric constant material. According to still other embodiments, the second fiber reinforced dielectric layer 222 may include a first high dielectric constant material. According to yet other embodiments, the third fiber reinforced dielectric layer 223 may include a second low dielectric constant material.

It will be appreciated that the radome structure 200 and all components described in reference to the radome structure 200 as shown in FIG. 2a may have any of the characteristics described herein with reference to corresponding components in FIGS. 1a and 1b. In particular, the characteristics of the radome structure 200, the inner tuning layer component 210, the laminate component 220, the first inner tuning layer 211, the first fiber reinforced dielectric layer 221, the second fiber reinforced dielectric layer 222, and the third fiber reinforced dielectric layer 223 shown in FIG. 2a may have any of the corresponding characteristics described herein in reference to the radome structure 100 (101), the inner tuning layer component 110, the laminate component 120, the first inner tuning layer 111, the second turning layer 112, the first fiber reinforced dielectric layer 121, the second fiber reinforced dielectric layer 122, and the third fiber reinforced dielectric layer 123 shown in FIGS. 1a and 1b, respectively.

Referring now specifically to FIG. 2a, according to certain embodiments, the protective layer may include an additional fiber-reinforced layer between the outermost layer of syntactic foam and paint layers.

Figure 2B:
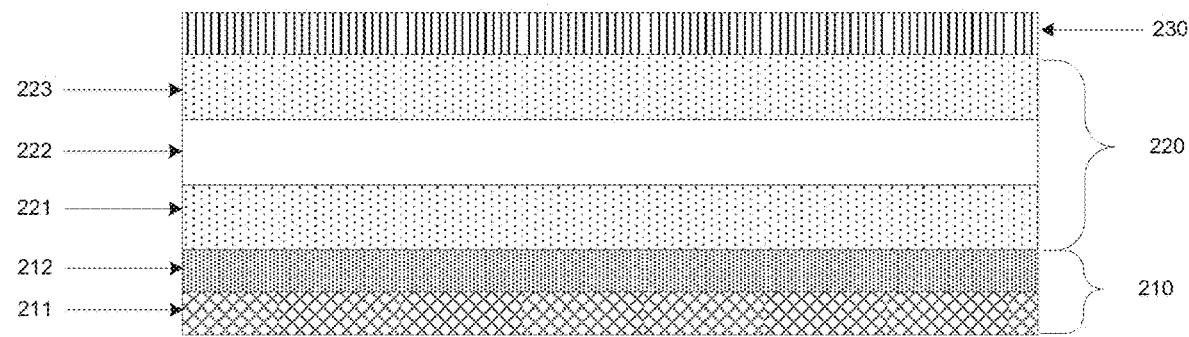

FIG. 2b includes an illustration of another alternative embodiment of a radome structure. For purposes of illustration and as shown in FIG. 2b, a radome structure 201 may include an inner tuning layer component 210, a laminate component 220 overlying the inner tuning layer component 210 and a protection layer 230 overlying the laminate component 220. According to particular embodiments, and as further shown in FIG. 2b, the inner tuning layer component 210 may include a first inner tuning layer 211 and a second inner tuning layer 212. According to still other embodiments, and as also shown in FIG. 2b, the laminate component 220 may include a first fiber reinforced dielectric layer 221, a second fiber reinforced dielectric layer 222 overlying the first fiber reinforced dielectric layer 221, and a third fiber reinforced dielectric layer 223 overlying the second fiber reinforced dielectric layer 222. According to certain embodiments, the first fiber reinforced dielectric layer 221 may include a first low dielectric constant material. According to still other embodiments, the second fiber reinforced dielectric layer 222 may include a first high dielectric constant material. According to yet other embodiments, the third fiber reinforced dielectric layer 223 may include a second low dielectric constant material.

It will be appreciated that the radome structure 201 and all components described in reference to the radome structure 201 as shown in FIG. 2b may have any of the characteristics described herein with reference to corresponding components in FIGS. 1a, 1b and 2a. In particular, the characteristics of the radome structure 201, the inner tuning layer component 210, the laminate component 220, the first inner tuning layer 211, the second inner tuning layer 212, the first fiber reinforced dielectric layer 221, the second fiber reinforced dielectric layer 222, and the third fiber reinforced dielectric layer 223 shown in FIG. 2b may have any of the corresponding characteristics described herein in reference to the radome structure 100 (101, 200), the inner tuning layer component 110 (210), the laminate component 120 (220), the first inner tuning layer 111 (211), the second turning layer 112, the first fiber reinforced dielectric layer 121 (221), the second fiber reinforced dielectric layer 122 (222), and the third fiber reinforced dielectric layer 123 (223) shown in FIGS. 1a, 1b and 2a, respectively.

Figure 3A:
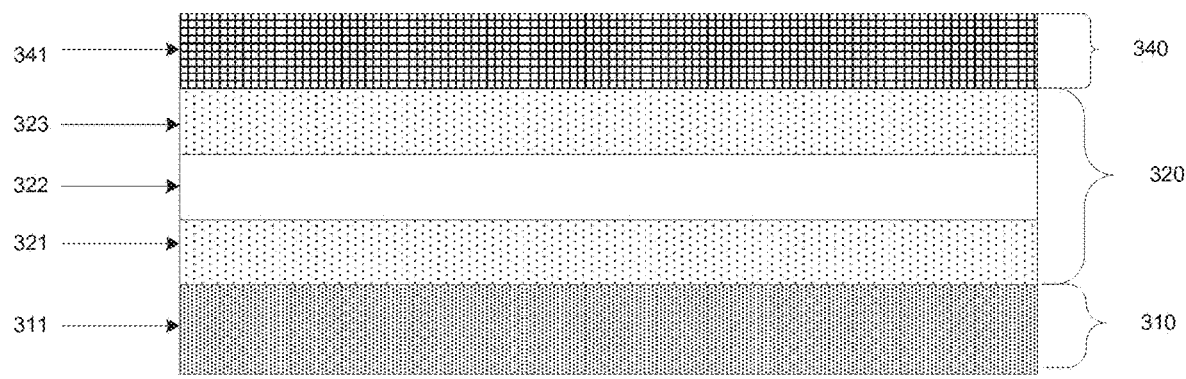
FIGS. 3a & 3b include illustrations of a radome structure according to embodiments described herein.

FIG. 3a includes an illustration of yet another alternative embodiment of a radome structure. For purposes of illustration and as shown in FIG. 3a, a radome structure 300 may include an inner tuning layer component 310, a laminate component 320 overlying the inner tuning layer component 310 and an outer tuning layer component 340 overlying the laminate component 320. According to particular embodiments, and as further shown in FIG. 3a, the inner tuning layer component 310 may include a first inner tuning layer 311. According to still other embodiments, and as also shown in FIG. 3a, the laminate component 320 may include a first fiber reinforced dielectric layer 321, a second fiber reinforced dielectric layer 322 overlying the first fiber reinforced dielectric layer 321, and a third fiber reinforced dielectric layer 323 overlying the second fiber reinforced dielectric layer 322. According to certain embodiments, the first fiber reinforced dielectric layer 321 may include a first low dielectric constant material. According to still other embodiments, the second fiber reinforced dielectric layer 322 may include a first high dielectric constant material. According to yet other embodiments, the third fiber reinforced dielectric layer 323 may include a second low dielectric constant material. According to yet other embodiments, and as also shown in FIG. 3a, the outer tuning layer component 340 may include a first outer tuning layer 341.

It will be appreciated that the radome structure 300 and all components described in reference to the radome structure 300 as shown in FIG. 3a may have any of the characteristics described herein with reference to corresponding components in FIGS. 1a, 1b, 2a and 2b. In particular, the characteristics of the radome structure 300, the inner tuning layer component 310, the laminate component 320, the first inner tuning layer 311, the first fiber reinforced dielectric layer 321, the second fiber reinforced dielectric layer 322, and the third fiber reinforced dielectric layer 323 shown in FIG. 3a may have any of the corresponding characteristics described herein in reference to the radome structure 100 (101, 200, 201), the inner tuning layer component 110 (210), the laminate component 120 (220), the first inner tuning layer 111 (211), the second turning layer 112 (212), the first fiber reinforced dielectric layer 121 (221), the second fiber reinforced dielectric layer 122 (222), and the third fiber reinforced dielectric layer 123 (223) shown in FIGS. 1a, 1b and 1C, respectively.

Referring now specifically to FIG. 3a, according to certain embodiments, the outer tuning layer component 340 may be a single layer of material. According to yet other embodiments and as shown in FIG. 3a, the single layer of material may be a single first outer tuning layer 341.

According to particular embodiments, the first outer tuning layer 341 may include a thermoset foam or a thermoplastic foam.

According to certain embodiments, where the first outer tuning layer 341 includes a thermoset foam, the thermoset foam may have a particular density. For example, the thermoset foam of the first outer tuning layer 341 may have a density of at least about 300 kg/m$^3$, such as, at least about 310 kg/m$^3$ or at least about 320 kg/m$^3$ or at least about 330 kg/m$^3$ or at least about 340 kg/m$^3$ or at least about 350 kg/m$^3$ or at least about 360 kg/m$^3$ or at least about 370 kg/m$^3$ or at least about 380 kg/m$^3$ or at least about 390 kg/m$^3$ or at least about 400 kg/m$^3$ or at least about 410 kg/m$^3$ or at least about 420 kg/m$^3$ or at least about 430 kg/m$^3$ or at least about 440 kg/m$^3$ or at least about 450 kg/m$^3$ or at least about 460 kg/m$^3$ or at least about 470 kg/m$^3$ or at least about 480 kg/m$^3$ or at least about 490 kg/m$^3$ or even at least about 500 kg/m$^3$. According to still other embodiments, the thermoset foam of the first outer tuning layer 341 may have a density of not greater than about 1000 kg/m$^3$, such as, not greater than about 990 kg/m$^3$ or not greater than about 980 kg/m$^3$ or not greater than about 970 kg/m$^3$ or not greater than about 960 kg/m$^3$ or not greater than about 950 kg/m$^3$ or not greater than about 940 kg/m$^3$ or not greater than about 930 kg/m$^3$ or not greater than about 920 kg/m$^3$ or not greater than about 910 kg/m$^3$ or not greater than about 900 kg/m$^3$ or not greater than about 890 kg/m$^3$ or not greater than about 880 kg/m$^3$ or not greater than about 870 kg/m$^3$ or not greater than about 860 kg/m$^3$ or not greater than about 850 kg/m$^3$ or not greater than about 840 kg/m$^3$ or not greater than about 830 kg/m$^3$ or not greater than about 820 kg/m$^3$ or not greater than about 810 kg/m$^3$ or even not greater than about 800 kg/m$^3$. It will be appreciated that the density of the thermoset foam of the first outer tuning layer 341 may be within a range between any of the minimum and maximum values noted above. It will be further appreciated that the density of the thermoset foam of the first outer tuning layer 341 may be any value between any of the minimum and maximum values noted above.

According to yet other embodiments, where the first outer tuning layer 341 includes a thermoset foam, the thermoset foam may have a particular dielectric constant. For example, the thermoset foam of the first outer tuning layer 341 may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, the thermoset foam of the first outer tuning layer 341 may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of the thermoset foam of the first outer tuning layer 341 may be within a range between any of the minimum and maximum values noted above. It will be further appreciated that the dielectric constant of the thermoset foam of the first outer tuning layer 341 may be any value between any of the minimum and maximum values noted above.

According to certain embodiments, where the first outer tuning layer 341 includes a thermoplastic foam, the thermoplastic foam may have a particular density. For example, the thermoplastic foam of the first outer tuning layer 341 may have a density of not greater than about 300 kg/m$^3$, such as, not greater than about 295 kg/m$^3$ or not greater than about 290 kg/m$^3$ or not greater than about 285 kg/m$^3$ or not greater than about 280 kg/m$^3$ or not greater than about 275 kg/m$^3$ or not greater than about 270 kg/m$^3$ or not greater than about 265 kg/m$^3$ or not greater than about 260 kg/m$^3$ or not greater than about 255 kg/m$^3$ or not greater than about 250 kg/m$^3$ or not greater than about 245 kg/m$^3$ or not greater than about 240 kg/m$^3$ or not greater than about 235 kg/m$^3$ or not greater than about 230 kg/m³ or not greater than about 225 kg/m³ or not greater than about 220 kg/m³ or not greater than about 215 kg/m³ or not greater than about 210 kg/m³ or not greater than about 205 kg/m³ or not greater than about 200 kg/m³. According to still other embodiments, the thermoplastic foam of the first outer tuning layer 341 may have a density of at least about 1 kg/m³, such as, at least about 10 kg/m³ or at least about 15 kg/m³ or at least about 20 kg/m³ or at least about 25 kg/m³ or at least about 30 kg/m³ or at least about 35 kg/m³ or at least about 40 kg/m³ or at least about 45 kg/m³ or at least about 50 kg/m³. It will be appreciated that the density of the thermoplastic foam of the first outer tuning layer 341 may be within a range between any of the minimum and maximum values noted above. It will be further appreciated that the density of the thermoplastic foam of the first outer tuning layer 341 may be any value between any of the minimum and maximum values noted above.

According to yet other embodiments, where the first outer tuning layer 341 includes a thermoplastic foam, the thermoplastic foam may have a particular dielectric constant. For example, the thermoplastic foam of the first outer tuning layer 341 may have a dielectric constant of not greater than about 1.5 or not greater than about 1.45 or not greater than about 1.4 or not greater than about 1.35 or not greater than about 1.30 or not greater than about 1.25 or not greater than about 1.20 or not greater than about 1.15 or not greater than about 1.10 or not greater than about 1.05 or even not greater than about 1.00. According to still other embodiments, the thermoplastic foam of the first outer tuning layer 341 may have a dielectric constant of at least about 0.01, such as, at least about 0.05 or at least about 0.10 or at least about 0.15 or at least about 0.20 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the thermoplastic foam of the first outer tuning layer 341 may be within a range between any of the minimum and maximum values noted above. It will be further appreciated that the dielectric constant of the thermoplastic foam of the first outer tuning layer 341 may be any value between any of the minimum and maximum values noted above.

According to still other embodiments, the first outer tuning layer 341 may include syntactic foam. According to still other embodiments, the first outer tuning layer 341 may include a plastic closed cell foam. According to still other embodiments, the first outer tuning layer 341 may include a combination of a syntactic foam, and a plastic closed cell foam. According to still other embodiments, the first outer tuning layer 341 may include a syntactic foam, a plastic closed cell foam, a polymethacrylimide (PMI), a polycarbonate (PC), a polyetherimide (PEI), a polyvinyl chloride (PVC), acrylonitrile butadiene styrene (ABS), styrofoam, or combinations thereof.

According to yet other embodiments, the first outer tuning layer 341 may have a particular thickness. For example, the first outer tuning layer 341 may have a thickness of at least about 0.1 mm, such as, at least about 0.3 mm or at least about 0.5 mm or at least about 0.7 mm or at least about 1.0 mm or at least about 1.3 mm or at least about 1.5 mm or at least about 1.7 mm or at least about 2.0 mm or at least about 2.5 mm or at least about 3.0 mm. According to yet other embodiments, the inner tuning layer 100 may have a thickness of not greater than about 6.25 mm, such as, not greater than about 6.0 mm or not greater than about 5.75 mm or not greater than about 5.5 mm or not greater than about 5.25 mm or not greater than about 5.0 mm or not greater than about 4.75 mm or not greater than about 4.5 mm or not greater than about 4.25 mm or not greater than about 4.0 mm or not greater than about 3.75 mm or even not greater than about 3.5 mm. It will be appreciated that the thickness of the first outer tuning layer 341 may be within a range between any of the minimum and maximum values noted above. It will be further appreciated that the thickness of the first outer tuning layer 341 may be any value between any of the minimum and maximum values noted above.

Figure 3B:
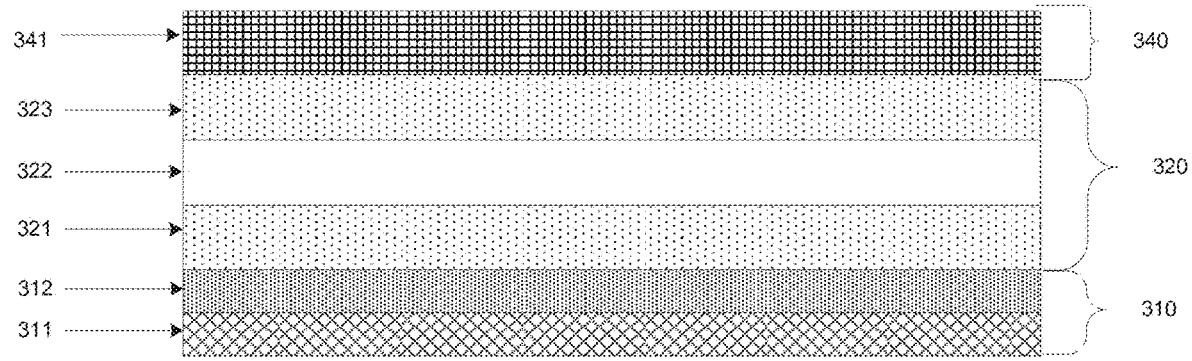

FIG. 3b includes an illustration of another alternative embodiment of a radome structure. For purposes of illustration and as shown in FIG. 3b, a radome structure 301 may include an inner tuning layer component 310, a laminate component 320 overlying the inner tuning layer component 310 and an outer tuning layer component 340 overlying the laminate component 320. According to particular embodiments, and as further shown in FIG. 3b, the inner tuning layer component 310 may include a first inner tuning layer 311 and a second inner tuning layer 212. According to still other embodiments, and as also shown in FIG. 3b, the laminate component 320 may include a first fiber reinforced dielectric layer 321, a second fiber reinforced dielectric layer 322 overlying the first fiber reinforced dielectric layer 321, and a third fiber reinforced dielectric layer 323 overlying the second fiber reinforced dielectric layer 322. According to certain embodiments, the first fiber reinforced dielectric layer 321 may include a first low dielectric constant material. According to still other embodiments, the second fiber reinforced dielectric layer 322 may include a first high dielectric constant material. According to yet other embodiments, the third fiber reinforced dielectric layer 323 may include a second low dielectric constant material.

It will be appreciated that the radome structure 301 and all components described in reference to the radome structure 301 as shown in FIG. 3b may have any of the characteristics described herein with reference to corresponding components in FIGS. 1a, 1b, 2a, 2b and 3a. In particular, the characteristics of the radome structure 301, the inner tuning layer component 310, the laminate component 320, the outer tuning layer component 340, the first inner tuning layer 311, the second inner tuning layer 312, the first fiber reinforced dielectric layer 321, the second fiber reinforced dielectric layer 322, and the third fiber reinforced dielectric layer 323 shown in FIG. 3b may have any of the corresponding characteristics described herein in reference to the radome structure 100 (101, 200, 201, 300), the inner tuning layer component 110 (210, 310), the laminate component 120 (220), the first inner tuning layer 111 (211), the second turning layer 112 (212), the first fiber reinforced dielectric layer 121 (221), the second fiber reinforced dielectric layer 122 (222), and the third fiber reinforced dielectric layer 123 (223) shown in FIGS. 1a, 1b, 2a, 2b and 3a, respectively.

Figure 4A:
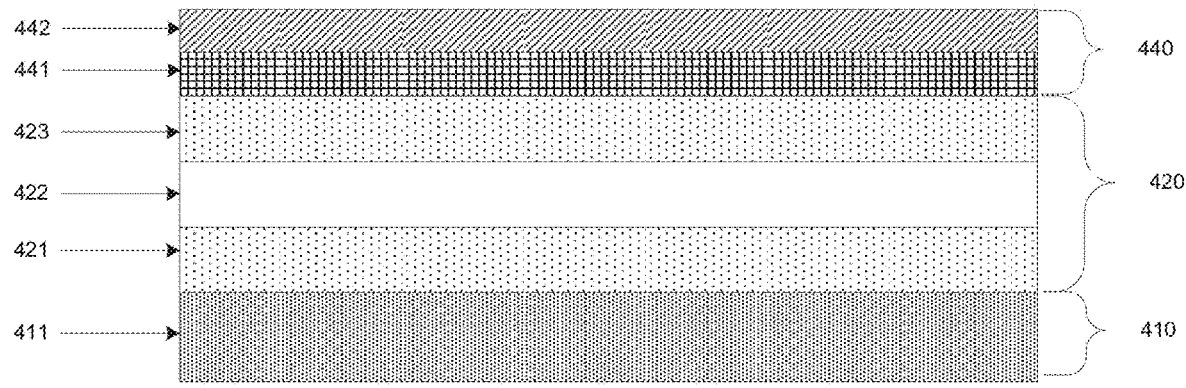
FIGS. 4a & 4b include illustrations of a radome structure according to embodiments described herein.

FIG. 4a includes an illustration of yet another alternative embodiment of a radome structure. For purposes of illustration and as shown in FIG. 4a, a radome structure 400 may include an inner tuning layer component 410, a laminate component 420 overlying the inner tuning layer component 410 and an outer tuning layer component 440 overlying the laminate component 420. According to particular embodiments, and as further shown in FIG. 4a, the inner tuning layer component 410 may include a first inner tuning layer 411. According to still other embodiments, and as also shown in FIG. 4a, the laminate component 420 may include a first fiber reinforced dielectric layer 421, a second fiber reinforced dielectric layer 422 overlying the first fiber reinforced dielectric layer 421, and a third fiber reinforced dielectric layer 423 overlying the second fiber reinforced dielectric layer 422. According to certain embodiments, the first fiber reinforced dielectric layer 421 may include a first low dielectric constant material. According to still other embodiments, the second fiber reinforced dielectric layer 422 may include a first high dielectric constant material. According to yet other embodiments, the third fiber reinforced dielectric layer 423 may include a second low dielectric constant material. According to yet other embodiments, and as also shown in FIG. 4a, the outer tuning layer component 440 may include a first outer tuning layer 441 and a second outer tuning layer 442.

It will be appreciated that the radome structure 400 and all components described in reference to the radome structure 400 as shown in FIG. 4a may have any of the characteristics described herein with reference to corresponding components in FIGS. 1a, 1b, 2a, 2b, 3a and 3b. In particular, the characteristics of the radome structure 400, the inner tuning layer component 410, the laminate component 420, the outer tuning layer component 440, the first inner tuning layer 411, the first fiber reinforced dielectric layer 421, the second fiber reinforced dielectric layer 422, and the third fiber reinforced dielectric layer 423 shown in FIG. 4a may have any of the corresponding characteristics described herein in reference to the radome structure 100 (101, 200, 201, 300, 301), the inner tuning layer component 110 (210, 310), the laminate component 120 (220, 320), the first inner tuning layer 111 (211, 311), the second turning layer 112 (212, 312), the first fiber reinforced dielectric layer 121 (221, 321), the second fiber reinforced dielectric layer 122 (222, 322), and the third fiber reinforced dielectric layer 123 (223, 323) shown in FIGS. 1a, 1b, 2a, 2b, 3a and 3b, respectively.

Referring now specifically to FIG. 4a, according to certain embodiments and as shown in FIG. 4a, the first outer tuning layer 441 of the of the outer tuning layer component 440 may located between the second outer tuning layer 442 and the laminate component 420.

According to still other embodiments, the dielectric constant of the first outer tuning layer 441 may be less than a dielectric constant of the second outer tuning layer 442.

According to particular embodiments, the second outer tuning layer 442 may include a thermoset foam or a thermoplastic foam.

According to certain embodiments, where the second outer tuning layer 442 includes a thermoset foam, the thermoset foam may have a particular density. For example, the thermoset foam of the second outer tuning layer 442 may have a density of at least about 300 kg/m$^3$, such as, at least about 310 kg/m$^3$ or at least about 320 kg/m$^3$ or at least about 330 kg/m$^3$ or at least about 340 kg/m$^3$ or at least about 350 kg/m$^3$ or at least about 360 kg/m$^3$ or at least about 370 kg/m$^3$ or at least about 380 kg/m$^3$ or at least about 390 kg/m$^3$ or at least about 400 kg/m$^3$ or at least about 410 kg/m$^3$ or at least about 420 kg/m$^3$ or at least about 430 kg/m$^3$ or at least about 440 kg/m$^3$ or at least about 450 kg/m$^3$ or at least about 460 kg/m$^3$ or at least about 470 kg/m$^3$ or at least about 480 kg/m$^3$ or at least about 490 kg/m$^3$ or even at least about 500 kg/m$^3$. According to still other embodiments, the thermoset foam of the second outer tuning layer 442 may have a density of not greater than about 1000 kg/m$^3$, such as, not greater than about 990 kg/m$^3$ or not greater than about 980 kg/m$^3$ or not greater than about 970 kg/m$^3$ or not greater than about 960 kg/m$^3$ or not greater than about 950 kg/m$^3$ or not greater than about 940 kg/m$^3$ or not greater than about 930 kg/m$^3$ or not greater than about 920 kg/m$^3$ or not greater than about 910 kg/m$^3$ or not greater than about 900 kg/m$^3$ or not greater than about 890 kg/m$^3$ or not greater than about 880 kg/m$^3$ or not greater than about 870 kg/m$^3$ or not greater than about 860 kg/m$^3$ or not greater than about 850 kg/m$^3$ or not greater than about 840 kg/m$^3$ or not greater than about 830 kg/m$^3$ or not greater than about 820 kg/m$^3$ or not greater than about 810 kg/m$^3$ or even not greater than about 800 kg/m$^3$. It will be appreciated that the density of the thermoset foam of the second outer tuning layer 442 may be within a range between any of the minimum and maximum values noted above. It will be further appreciated that the density of the thermoset foam of the second outer tuning layer 442 may be any value between any of the minimum and maximum values noted above.

According to yet other embodiments, where the second outer tuning layer 442 includes a thermoset foam, the thermoset foam may have a particular dielectric constant. For example, the thermoset foam of the second outer tuning layer 442 may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, the thermoset foam of the second outer tuning layer 442 may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of the thermoset foam of the second outer tuning layer 442 may be within a range between any of the minimum and maximum values noted above. It will be further appreciated that the dielectric constant of the thermoset foam of the second outer tuning layer 442 may be any value between any of the minimum and maximum values noted above.

According to certain embodiments, where the second outer tuning layer 442 includes a thermoplastic foam, the thermoplastic foam may have a particular density. For example, the thermoplastic foam of the second outer tuning layer 442 may have a density of not greater than about 300 kg/m$^3$, such as, not greater than about 295 kg/m$^3$ or not greater than about 290 kg/m$^3$ or not greater than about 285 kg/m$^3$ or not greater than about 280 kg/m$^3$ or not greater than about 275 kg/m$^3$ or not greater than about 270 kg/m$^3$ or not greater than about 265 kg/m$^3$ or not greater than about 260 kg/m$^3$ or not greater than about 255 kg/m$^3$ or not greater than about 250 kg/m$^3$ or not greater than about 245 kg/m$^3$ or not greater than about 240 kg/m$^3$ or not greater than about 235 kg/m$^3$ or not greater than about 230 kg/m$^3$ or not greater than about 225 kg/m$^3$ or not greater than about 220 kg/m$^3$ or not greater than about 215 kg/m$^3$ or not greater than about 210 kg/m$^3$ or not greater than about 205 kg/m$^3$ or not greater than about 200 kg/m$^3$. According to still other embodiments, the thermoplastic foam of the second outer tuning layer 442 may have a density of at least about 1 kg/m$^3$, such as, at least about 10 kg/m$^3$ or at least about 15 kg/m$^3$ or at least about 20 kg/m$^3$ or at least about 25 kg/m$^3$ or at least about 30 kg/m$^3$ or at least about 35 kg/m$^3$ or at least about 40 kg/m$^3$ or at least about 45 kg/m$^3$ or at least about 50 kg/m$^3$. It will be appreciated that the density of the thermoplastic foam of the second outer tuning layer 442 may be within a range between any of the minimum and maximum values noted above. It will be further appreciated that the density of the thermoplastic foam of the second outer tuning layer 442 may be any value between any of the minimum and maximum values noted above.

According to yet other embodiments, where the second outer tuning layer 442 includes a thermoplastic foam, the thermoplastic foam may have a particular dielectric constant. For example, the thermoplastic foam of the second outer tuning layer 442 may have a dielectric constant of not greater than about 1.5 or not greater than about 1.45 or not greater than about 1.4 or not greater than about 1.35 or not greater than about 1.30 or not greater than about 1.25 or not greater than about 1.20 or not greater than about 1.15 or not greater than about 1.10 or not greater than about 1.05 or even not greater than about 1.00. According to still other embodiments, the thermoplastic foam of the second outer tuning layer 442 may have a dielectric constant of at least about 0.01, such as, at least about 0.05 or at least about 0.10 or at least about 0.15 or at least about 0.20 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the thermoplastic foam of the second outer tuning layer 442 may be within a range between any of the minimum and maximum values noted above. It will be further appreciated that the dielectric constant of the thermoplastic foam of the second outer tuning layer 442 may be any value between any of the minimum and maximum values noted above.

According to still other embodiments, the second outer tuning layer 442 may include syntactic foam. According to still other embodiments, the second outer tuning layer 442 may include a plastic closed cell foam. According to still other embodiments, the second outer tuning layer 442 may include a combination of a syntactic foam, and a plastic closed cell foam. According to still other embodiments, the second outer tuning layer 442 may include a syntactic foam, a plastic closed cell foam, a polymethacrylimide (PMI), a polycarbonate (PC), a polyetherimide (PEI), a polyvinyl chloride (PVC), acrylonitrile butadiene styrene (ABS), styrofoam, or combinations thereof.

According to yet other embodiments, the second outer tuning layer 442 may have a particular thickness. For example, the second outer tuning layer 442 may have a thickness of at least about 0.1 mm, such as, at least about 0.3 mm or at least about 0.5 mm or at least about 0.7 mm or at least about 1.0 mm or at least about 1.3 mm or at least about 1.5 mm or at least about 1.7 mm or at least about 2.0 mm or at least about 2.5 mm or at least about 3.0 mm. According to yet other embodiments, the inner tuning layer 100 may have a thickness of not greater than about 6.25 mm, such as, not greater than about 6.0 mm or not greater than about 5.75 mm or not greater than about 5.5 mm or not greater than about 5.25 mm or not greater than about 5.0 mm or not greater than about 4.75 mm or not greater than about 4.5 mm or not greater than about 4.25 mm or not greater than about 4.0 mm or not greater than about 3.75 mm or even not greater than about 3.5 mm. It will be appreciated that the thickness of the second outer tuning layer 442 may be within a range between any of the minimum and maximum values noted above. It will be further appreciated that the thickness of the second outer tuning layer 442 may be any value between any of the minimum and maximum values noted above.

Figure 4B:
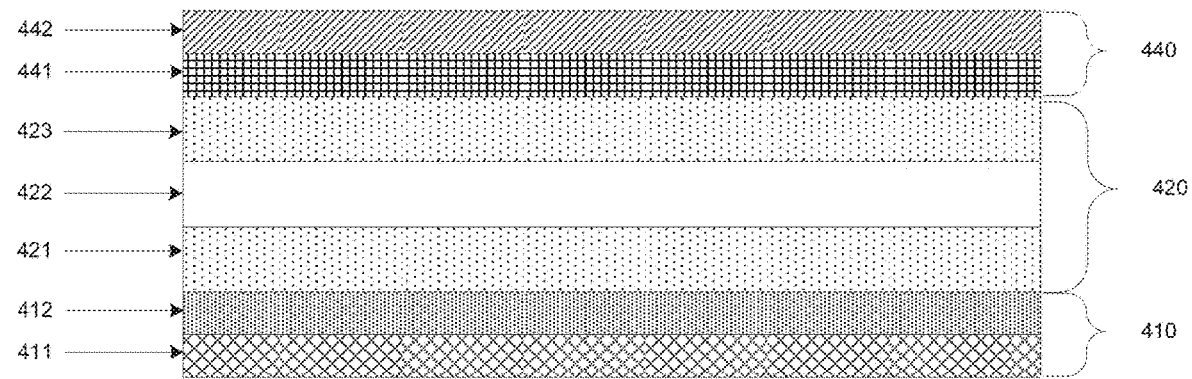

FIG. 4b includes an illustration of another alternative embodiment of a radome structure. For purposes of illustration and as shown in FIG. 4b, a radome structure 401 may include an inner tuning layer component 410, a laminate component 420 overlying the inner tuning layer component 410 and an outer tuning layer component 440 overlying the laminate component 420. According to particular embodiments, and as further shown in FIG. 4b, the inner tuning layer component 410 may include a first inner tuning layer 411 and a second inner tuning layer 412. According to still other embodiments, and as also shown in FIG. 4b, the laminate component 420 may include a first fiber reinforced dielectric layer 421, a second fiber reinforced dielectric layer 422 overlying the first fiber reinforced dielectric layer 421, and a third fiber reinforced dielectric layer 423 overlying the second fiber reinforced dielectric layer 422. According to certain embodiments, the first fiber reinforced dielectric layer 421 may include a first low dielectric constant material. According to still other embodiments, the second fiber reinforced dielectric layer 422 may include a first high dielectric constant material. According to yet other embodiments, the third fiber reinforced dielectric layer 423 may include a second low dielectric constant material. According to yet other embodiments, and as also shown in FIG. 4b, the outer tuning layer component 440 may include a first outer tuning layer 441 and a second outer tuning layer 442.

It will be appreciated that the radome structure 401 and all components described in reference to the radome structure 401 as shown in FIG. 4b may have any of the characteristics described herein with reference to corresponding components in FIGS. 1a, 1b, 2a, 2b, 3a, 3b and 4a. In particular, the characteristics of the radome structure 401, the inner tuning layer component 410, the laminate component 420, the outer tuning layer component 440, the first inner tuning layer 411, the second inner tuning layer 412, the first fiber reinforced dielectric layer 421, the second fiber reinforced dielectric layer 422, and the third fiber reinforced dielectric layer 423 shown in FIG. 4b may have any of the corresponding characteristics described herein in reference to the radome structure 100 (101, 200, 201, 300, 301), the inner tuning layer component 110 (210, 310), the laminate component 120 (220), the first inner tuning layer 111 (211), the second turning layer 112 (212), the first fiber reinforced dielectric layer 121 (221), the second fiber reinforced dielectric layer 122 (222), and the third fiber reinforced dielectric layer 123 (223) shown in FIGS. 1a, 1b, 2a, 2b and 3a, respectively.

Figure 5A:
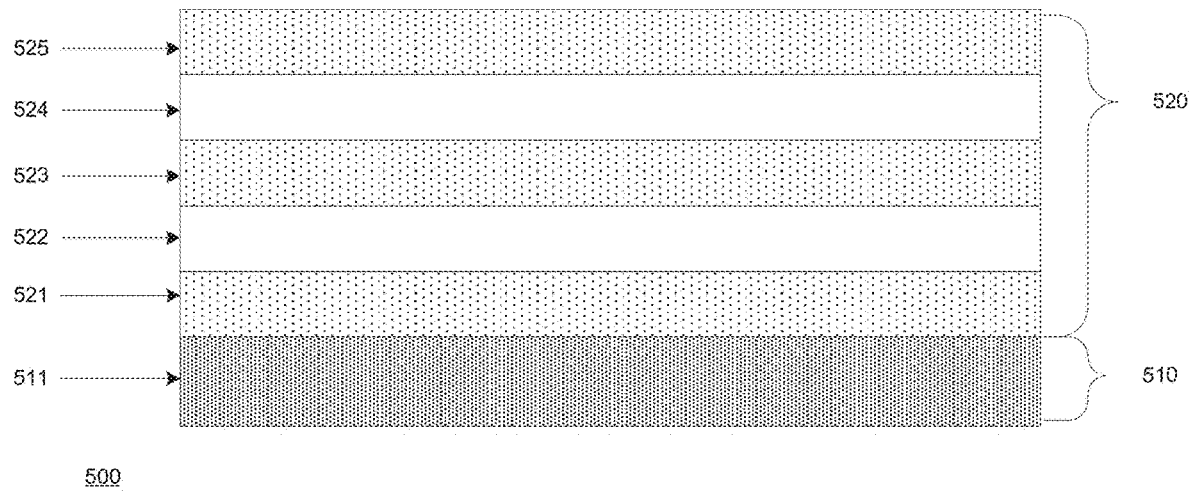
FIGS. 5a & 5b include illustrations of a radome structure according to embodiments described herein.

FIG. 5a includes an illustration of yet another alternative embodiment of a radome structure. For purposes of illustration and as shown in FIG. 5a, a radome structure 500 may include an inner tuning layer component 510 and a laminate component 520 overlying the inner tuning layer component 510. According to particular embodiments, and as further shown in FIG. 5a, the inner tuning layer component 510 may include a first inner tuning layer 511. According to still other embodiments, and as also shown in FIG. 5a, the laminate component 520 may include a first fiber reinforced dielectric layer 521, a second fiber reinforced dielectric layer 522 overlying the first fiber reinforced dielectric layer 521, a third fiber reinforced dielectric layer 523 overlying the second fiber reinforced dielectric layer 522, a fourth fiber reinforced dielectric layer 524 overlying the third fiber reinforced dielectric layer 523, and a fifth fiber reinforced dielectric layer 525 overlying the fourth fiber reinforced dielectric layer 524. According to certain embodiments, the first fiber reinforced dielectric layer 521 may include a first low dielectric constant material. According to still other embodiments, the second fiber reinforced dielectric layer 522 may include a first high dielectric constant material. According to yet other embodiments, the third fiber reinforced dielectric layer 523 may include a second low dielectric constant material. According to still other embodiments, the fourth fiber reinforced dielectric layer 524 may include a second high dielectric constant material. According to yet other embodiments, the fifth fiber reinforced dielectric layer 525 may include a third low dielectric constant material.

It will be appreciated that the radome structure 500 and all components described in reference to the radome structure 500 as shown in FIG. 5a may have any of the characteristics described herein with reference to corresponding components in FIGS. 1a, 1b, 2a and 2b. In particular, the characteristics of the radome structure 500, the inner tuning layer component 510, the laminate component 520, the first inner tuning layer 511, the second inner tuning layer 512, the first fiber reinforced dielectric layer 521, the second fiber reinforced dielectric layer 522, and the third fiber reinforced dielectric layer 523 shown in FIG. 5a may have any of the corresponding characteristics described herein in reference to the radome structure 100 (101, 200, 201, 300, 301, 400, 401), the inner tuning layer component 110 (210, 310, 410), the laminate component 120 (220, 220, 320, 420), the first inner turning layer 111 (211, 311, 411), the second turning layer 112 (212, 312, 412), the first fiber reinforced dielectric layer 121 (221, 321, 421), the second fiber reinforced dielectric layer 122 (222), and the third fiber reinforced dielectric layer 123 (223, 323, 423) shown in FIGS. 1a, 1b, 2a and 2b, respectively.

Referring now specifically to FIG. 5a, according to yet other embodiments, the second high dielectric constant material of the fourth fiber reinforced dielectric layer 524 may have a particular dielectric constant. For example, the second high dielectric constant material may have a dielectric constant of not greater than about 8, such as not greater than about 8.75 or not greater than about 8.5 or not greater than about 8.25 or not greater than about 8.0 or not greater than about 7.75 or not greater than about 7.5 or not greater than about 7.25 or not greater than about 7.0 or not greater than about 6.75 or not greater than about 6.5 or not greater than about 6.25 or not greater than about 6.0 or not greater than about 5.75 or not greater than about 5.5 or not greater than about 5.25 or not greater than about 5.0. According to still other embodiments, the second high dielectric constant material may have a dielectric constant of at least about 2.5, such as at least about 2.75 or at least about 3.0 or at least about 3.25 or at least about 3.5 or at least about 3.75 or at least about 4.0 or at least about 4.25 or at least about 4.5 or even at least about 4.75. It will be appreciated that the dielectric constant of the second high dielectric constant material may be within a range between any of the minimum and maximum values noted above. It will be further appreciated that the dielectric constant of the second high dielectric constant material may be any value between any of the minimum and maximum values noted above.

According to yet other embodiments, the fourth fiber reinforced dielectric layer 524 may have a particular dielectric constant. For example, the fourth fiber reinforced dielectric layer 524 may have a dielectric constant of not greater than about 8, such as not greater than about 8.75 or not greater than about 8.5 or not greater than about 8.25 or not greater than about 8.0 or not greater than about 7.75 or not greater than about 7.5 or not greater than about 7.25 or not greater than about 7.0 or not greater than about 6.75 or not greater than about 6.5 or not greater than about 6.25 or not greater than about 6.0 or not greater than about 5.75 or not greater than about 5.5 or not greater than about 5.25 or not greater than about 5.0. According to still other embodiments, the fourth fiber reinforced dielectric layer 524 may have a dielectric constant of at least about 2.5, such as at least about 2.75 or at least about 3.0 or at least about 3.25 or at least about 3.5 or at least about 3.75 or at least about 4.0 or at least about 4.25 or at least about 4.5 or even at least about 4.75. It will be appreciated that the fourth fiber reinforced dielectric layer 524 may be within a range between any of the minimum and maximum values noted above. It will be further appreciated that the fourth fiber reinforced dielectric layer 524 may be any value between any of the minimum and maximum values noted above.

According to still other embodiments, the second high dielectric constant material of the fourth fiber reinforced dielectric layer 524 may include glass fibers in a polymer matrix. According to still other embodiments, the second high dielectric constant material of the fourth fiber reinforced dielectric layer 524 may include glass fibers in a polyester matrix. According to yet other embodiments, the second high dielectric constant material of the fourth fiber reinforced dielectric layer 524 may include glass fibers in a resin matrix. According to still other embodiments, the second high dielectric constant material of the fourth fiber reinforced dielectric layer 524 may include glass fibers in a cyanate ester matrix. According to still other embodiments, the second high dielectric constant material of the fourth fiber reinforced dielectric layer 524 may include any combination of glass fibers in a polymer matrix, glass fibers in a polyester matrix, glass fibers in a resin matrix, and glass fibers in a cyanate ester matrix.

According to still other embodiments, the fourth fiber reinforced dielectric layer 524 may include glass fibers in a polymer matrix. According to still other embodiments, the fourth fiber reinforced dielectric layer 524 may include glass fibers in a polyester matrix. According to yet other embodiments, the fourth fiber reinforced dielectric layer 524 may include glass fibers in a resin matrix. According to still other embodiments, the fourth fiber reinforced dielectric layer 524 may include glass fibers in a cyanate ester matrix. According to still other embodiments, the fourth fiber reinforced dielectric layer 524 may include any combination of glass fibers in a polymer matrix, glass fibers in a polyester matrix, glass fibers in a resin matrix, and glass fibers in a cyanate ester matrix.

According to yet other embodiments, the fourth fiber reinforced dielectric layer 524 may have a particular thickness. For example, the fourth fiber reinforced dielectric layer 524 may have a thickness of at least about 0.10 mm, such as at least about 0.11 mm or at least about 0.12 mm or at least about 0.13 mm or at least about 0.14 mm or at least about 0.15 mm or at least about 0.2 mm or at least about 0.3 mm or at least about 0.4 mm or at least about 0.5 mm or at least about 1.0 mm or at least about 1.5 mm or even at least about 2.0 mm. According to still other embodiments, the fourth fiber reinforced dielectric layer 524 may have a thickness of not greater than about 6.5 mm, such as not greater than about 6.0 mm or not greater than about 5.5 mm or not greater than about 5.0 mm or not greater than about 4.5 or even not greater than about 4.0 mm. It will be appreciated that the thickness of the fourth fiber reinforced dielectric layer 524 may be within a range between any of the minimum and maximum values noted above. It will be further appreciated that the thickness of the fourth fiber reinforced dielectric layer 524 may be any value between any of the minimum and maximum values noted above.

According to yet other embodiments, the third low dielectric constant material of the fifth fiber reinforced dielectric layer 525 may have a particular dielectric constant. For example, the third low dielectric constant material may have a dielectric constant of not greater than about 3.5, such as not greater than about 3.45 or not greater than about 3.4 or not greater than about 3.35 or not greater than about 3.3 or not greater than about 3.25 or not greater than about 3.2 or not greater than about 3.15 or not greater than about 3.1 or not greater than about 3.05 or even not greater than about 3.0. According to still other embodiments, the third low dielectric constant material may have a dielectric constant of at least about 1.5, such as at least about 1.55 or at least about 1.6 or at least about 1.65 or at least about 1.7 or at least about 1.75 or at least about 1.8 or at least about 1.85 or at least about 1.9 or at least about 1.95 or even at least about 2.0. It will be appreciated that the dielectric constant of the third low dielectric constant material may be within a range between any of the minimum and maximum values noted above. It will be further appreciated that the dielectric constant of the third low dielectric constant material may be any value between any of the minimum and maximum values noted above.

According to yet other embodiments, the fifth fiber reinforced dielectric layer 525 may have a particular dielectric constant. For example, the fifth fiber reinforced dielectric layer 525 may have a dielectric constant of not greater than about 3.5, such as not greater than about 3.45 or not greater than about 3.4 or not greater than about 3.35 or not greater than about 3.3 or not greater than about 3.25 or not greater than about 3.2 or not greater than about 3.15 or not greater than about 3.1 or not greater than about 3.05 or even not greater than about 3.0. According to still other embodiments, the fifth fiber reinforced dielectric layer 525 may have a dielectric constant of at least about 1.5, such as at least about 1.55 or at least about 1.6 or at least about 1.65 or at least about 1.7 or at least about 1.75 or at least about 1.8 or at least about 1.85 or at least about 1.9 or at least about 1.95 or even at least about 2.0. It will be appreciated that the dielectric constant of the fifth fiber reinforced dielectric layer 525 may be within a range between any of the minimum and maximum values noted above. It will be further appreciated that the dielectric constant of the fifth fiber reinforced dielectric layer 525 may be any value between any of the minimum and maximum values noted above.

According to still other embodiments, the third low dielectric constant material of the fifth fiber reinforced dielectric layer 525 may include polyethylene (PE), polypropylene (PP), polytetrafluoroethylene (PTFE), polyamide (PA) or combinations thereof. According to still other embodiments, the third low dielectric constant material of the fifth fiber reinforced dielectric layer 525 may include polyethylene (PE) fibers, polypropylene (PP) fibers, polytetrafluoroethylene (PTFE) fibers, polyamide (PA) fibers, or combinations thereof. According to yet other embodiments, the third low dielectric constant material of the fifth fiber reinforced dielectric layer 525 may include polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

According to still other embodiments, the fifth fiber reinforced dielectric layer 525 may include polyethylene (PE), polypropylene (PP), polytetrafluoroethylene (PTFE), polyamide (PA) or combinations thereof. According to still other embodiments, the fifth fiber reinforced dielectric layer 525 may include polyethylene (PE) fibers, polypropylene (PP) fibers, polytetrafluoroethylene (PTFE) fibers, polyamide (PA) fibers, or combinations thereof. According to yet other embodiments, the fifth fiber reinforced dielectric layer 525 may include polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

According to yet other embodiments, the fifth fiber reinforced dielectric layer 525 may have a particular thickness. For example, the fifth fiber reinforced dielectric layer 525 may have a thickness of at least about 0.10 mm, such as at least about 0.11 mm or at least about 0.12 mm or at least about 0.13 mm or at least about 0.14 mm or at least about 0.15 mm or at least about 0.2 mm or at least about 0.3 mm or at least about 0.4 mm or at least about 0.5 mm or at least about 1.0 mm or at least about 1.5 mm or even at least about 2.0 mm. According to still other embodiments, the fifth fiber reinforced dielectric layer 525 may have a thickness of not greater than about 6.5 mm, such as not greater than about 6.0 mm or not greater than about 5.5 mm or not greater than about 5.0 mm or not greater than about 4.5 or even not greater than about 4.0 mm. It will be appreciated that the thickness of the fifth fiber reinforced dielectric layer 525 may be within a range between any of the minimum and maximum values noted above. It will be further appreciated that the thickness of the fifth fiber reinforced dielectric layer 525 may be any value between any of the minimum and maximum values noted above.

Figure 5B:
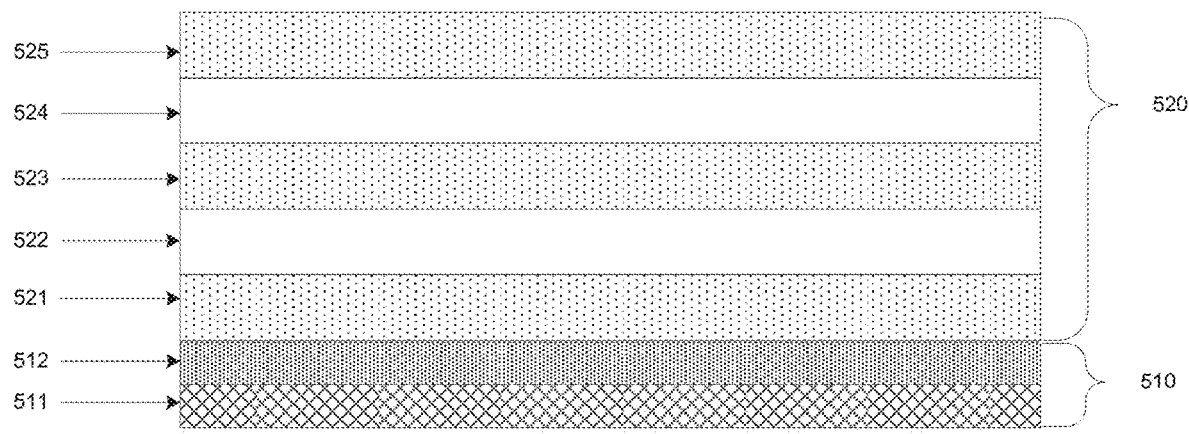

FIG. 5b includes an illustration of still another alternative embodiment of a radome structure. For purposes of illustration and as shown in FIG. 5b, a radome structure 501 may include an inner tuning layer component 510 and a laminate component 520 overlying the inner tuning layer component 510. According to particular embodiments, and as further shown in FIG. 5b, the inner tuning layer component 510 may include a first inner tuning layer 511 and a second inner tuning layer 512. According to still other embodiments, and as also shown in FIG. 5b, the laminate component 520 may include a first fiber reinforced dielectric layer 521, a second fiber reinforced dielectric layer 522 overlying the first fiber reinforced dielectric layer 521, a third fiber reinforced dielectric layer 523 overlying the second fiber reinforced dielectric layer 522, a fourth fiber reinforced dielectric layer 524 overlying the third fiber reinforced dielectric layer 523, and a fifth fiber reinforced dielectric layer 525 overlying the fourth fiber reinforced dielectric layer 524. According to certain embodiments, the first fiber reinforced dielectric layer 521 may include a first low dielectric constant material. According to still other embodiments, the second fiber reinforced dielectric layer 522 may include a first high dielectric constant material. According to yet other embodiments, the third fiber reinforced dielectric layer 523 may include a second low dielectric constant material. According to still other embodiments, the fourth fiber reinforced dielectric layer 524 may include a second high dielectric constant material. According to yet other embodiments, the fifth fiber reinforced dielectric layer 525 may include a third low dielectric constant material.

It will be appreciated that the radome structure 501 and all components described in reference to the radome structure 501 as shown in FIG. 5b may have any of the characteristics described herein with reference to corresponding components in FIGS. 1a, 1b, 2a, 2b and 5a. In particular, the characteristics of the radome structure 501, the inner tuning layer component 510, the laminate component 520, the first inner tuning layer 511, the second inner tuning layer 512, the first fiber reinforced dielectric layer 521, the second fiber reinforced dielectric layer 522, the third fiber reinforced dielectric layer 523, the fourth fiber reinforced dielectric layer 524, and the fifth fiber reinforced dielectric layer 525 shown in FIG. 5b may have any of the corresponding characteristics described herein in reference to the radome structure 100 (101, 200, 201, 300, 301, 400, 401, 500), the inner tuning layer component 110 (210, 310, 410, 510), the laminate component 120 (220, 320, 420, 520), the first inner tuning layer 111 (211, 311, 411, 511), the second turning layer 112 (212, 312, 412), the first fiber reinforced dielectric layer 121 (221, 321, 421, 521), the second fiber reinforced dielectric layer 122 (222, 322, 422, 522), the third fiber reinforced dielectric layer 123 (223, 323, 423, 523), the fourth fiber reinforced dielectric layer 524, and the fifth fiber reinforced dielectric layer 525 shown in FIGS. 1a, 1b, 2a, 2b, and/or 5a respectively.

According to still other embodiments, the radome structure 500 of FIG. 5a and the radome structure 501 of FIG. 5b may further include a protection layer (not shown in FIG. 5a or 5b) overlying the laminate component 520. It will be appreciated that the protection layer may have any of the characteristics described herein in reference to the protection layer 230 shown in FIGS. 2a and 2b.

According to still other embodiments, the radome structure 500 of FIG. 5a and the radome structure 501 of FIG. 5b may further include an outer tuning layer component (not shown in FIG. 5a or 5b) overlying the laminate component 520. It will be appreciated that the outer tuning layer component may have any of the characteristics described herein in reference to the outer tuning layer component 440 shown in FIGS. 3a, 3b, 4a and 4b.

It will be appreciated that according to other particular embodiments, any radome structure described herein (i.e., radome structures 100, 101, 200, 201, 300, 301, 400, 401, 500 or 501) may alternatively include an intermediate tuning layer located between any two of the fiber-reinforced layers. According to still other embodiments, any radome structure described herein (i.e., radome structures 100, 101, 200, 201, 300, 301, 400, 401, 500 or 501) may alternatively include an intermediate tuning layer located between each of the fiber-reinforced layers in the radome structure.

According to certain embodiments, an intermediate tuning layer in a radome structure may include a polymer resin material. According to still other embodiments, an intermediate tuning layer in the radome structure may include a syntactic foam.

According to yet other embodiments, an intermediate tuning layer in the radome structure may have a particular density. For example, an intermediate tuning layer in the radome structure may have a density of at least about 300 kg/m$^3$, such as, at least about 310 kg/m$^3$ or at least about 320 kg/m$^3$ or at least about 330 kg/m$^3$ or at least about 340 kg/m$^3$ or at least about 350 kg/m$^3$ or at least about 360 kg/m$^3$ or at least about 370 kg/m$^3$ or at least about 380 kg/m$^3$ or at least about 390 kg/m$^3$ or at least about 400 kg/m$^3$ or at least about 410 kg/m$^3$ or at least about 420 kg/m$^3$ or at least about 430 kg/m$^3$ or at least about 440 kg/m$^3$ or at least about 450 kg/m$^3$ or at least about 460 kg/m$^3$ or at least about 470 kg/m$^3$ or at least about 480 kg/m$^3$ or at least about 490 kg/m$^3$ or even at least about 500 kg/m$^3$. According to still other embodiments, an intermediate tuning layer in the radome structure may have a density of not greater than about 1000 kg/m$^3$, such as, not greater than about 990 kg/m$^3$ or not greater than about 980 kg/m$^3$ or not greater than about 970 kg/m$^3$ or not greater than about 960 kg/m$^3$ or not greater than about 950 kg/m$^3$ or not greater than about 940 kg/m$^3$ or not greater than about 930 kg/m$^3$ or not greater than about 920 kg/m$^3$ or not greater than about 910 kg/m$^3$ or not greater than about 900 kg/m$^3$ or not greater than about 890 kg/m$^3$ or not greater than about 880 kg/m$^3$ or not greater than about 870 kg/m$^3$ or not greater than about 860 kg/m$^3$ or not greater than about 850 kg/m$^3$ or not greater than about 840 kg/m$^3$ or not greater than about 830 kg/m$^3$ or not greater than about 820 kg/m$^3$ or not greater than about 810 kg/m$^3$ or even not greater than about 800 kg/m$^3$. It will be appreciated that the density of an intermediate tuning layer in the radome structure may be within a range between any of the minimum and maximum values noted above. It will be further appreciated that an intermediate tuning layer in the radome structure may be any value between any of the minimum and maximum values noted above.

According to yet other embodiments, an intermediate tuning layer in the radome structure may have a particular dielectric constant. For example, an intermediate tuning layer in the radome structure may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, an intermediate tuning layer in the radome structure may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of an intermediate tuning layer in the radome structure may be within a range between any of the minimum and maximum values noted above. It will be further appreciated that the dielectric constant of an intermediate tuning layer in the radome structure may be any value between any of the minimum and maximum values noted above.

According to yet other embodiments, an intermediate tuning layer in the radome structure may have a particular thickness. For example, an intermediate tuning layer in the radome structure may have a thickness of at least about 0.1 mm, such as, at least about 0.3 mm or at least about 0.5 mm or at least about 0.7 mm or at least about 1.0 mm or at least about 1.3 mm or at least about 1.5 mm or at least about 1.7 mm or at least about 2.0 mm or at least about 2.5 mm or at least about 3.0 mm. According to yet other embodiments, an intermediate tuning layer in the radome structure may have a thickness of not greater than about 6.5 mm, such as, not greater than about 6.25 or not greater than about 6.0 mm or not greater than about 5.75 mm or not greater than about 5.5 mm or not greater than about 5.25 mm or not greater than about 5.0 mm or not greater than about 4.75 mm or not greater than about 4.5 mm or not greater than about 4.25 mm or not greater than about 4.0 mm or not greater than about 3.75 mm or even not greater than about 3.5 mm. It will be appreciated that the thickness of an intermediate tuning layer in the radome structure may be within a range between any of the minimum and maximum values noted above. It will be further appreciated that an intermediate tuning layer in the radome structure may be any value between any of the minimum and maximum values noted above.

It will be appreciated that a radome having a structure formed according to embodiments described herein was simulated and shown to improve performance of the radome by as much as 0.5 dB or greater in co-polarization within frequency ranges across the K- and Ka-bands compared with comparative radome structures. Additionally, a radome having a structure formed according to embodiments described herein was simulated and shown to improve performance of the radome by as much as 10 dB or greater in cross-polarization within frequency ranges across the K- and Ka-bands compared with comparative radome structures.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A radome structure comprising: an inner tuning layer component comprising a thermoset foam having a density of at least about 300 kg/m$^3$ and not greater than about 1000 kg/m$^3$ {actual 600 kg/m$^3$} and a dielectric constant of at least about 1.05 and not greater than about 3, or a thermoplastic foam having a density of not greater than about 300 kg/m$^3$ and a dielectric constant of not greater than about 1.5; and a laminate component overlying the inner tuning layer component, wherein the laminate component comprises: a first fiber reinforced dielectric layer comprising a first low dielectric constant material; a second fiber reinforced dielectric layer comprising a first high dielectric constant material and overlying the first fiber reinforced dielectric layer; and a third fiber reinforced dielectric layer comprising a second low dielectric constant material and overlying the second fiber reinforced dielectric layer.

Embodiment 2

A radome structure comprising: an inner tuning layer component comprising a syntactic foam, a polyvinyl chloride (PVC), a plastic closed cell foam, or combinations thereof; and a laminate component overlying the inner tuning layer component, wherein the laminate component comprises: a first fiber reinforced dielectric layer comprising a first low dielectric constant material; a second fiber reinforced dielectric layer comprising a first high dielectric constant material and overlying the first fiber reinforced dielectric layer; and a third fiber reinforced dielectric layer comprising a second low dielectric constant material and overlying the second fiber reinforced dielectric layer.

Embodiment 3

The radome structure of any one of embodiments 1 and 2, wherein the inner tuning layer component comprises a syntactic foam, a polyvinyl chloride (PVC), a plastic closed cell foam, or combinations thereof.

Embodiment 4

The radome structure of any one of embodiments 1 and 2, wherein the inner tuning layer component has a thickness of at least about 0.1 mm.

Embodiment 5

The radome structure of any one of embodiments 1 and 2, wherein the inner tuning layer component has a thickness of not greater than about 12.5 mm.

Embodiment 6

The radome structure of any one of embodiments 1 and 2, wherein the inner tuning layer component is a single tuning layer.

Embodiment 7

The radome structure of embodiment 6, wherein the single tuning layer of the inner tuning layer component comprises a syntactic foam, a polyvinyl chloride (PVC), a plastic closed cell foam, or combinations thereof.

Embodiment 8

The radome structure of embodiment 6, wherein the single tuning layer has a thickness of at least about 0.1 mm.

Embodiment 9

The radome structure of embodiment 6, wherein the single tuning layer has a thickness of not greater than about 6.25 mm.

Embodiment 10

The radome structure of any one of embodiments 1 and 2, wherein the inner tuning layer component comprises a first inner tuning layer and a second inner tuning layer, wherein the second inner tuning layer is located between the first inner tuning layer and the laminate component, and wherein a dielectric constant of the first inner tuning layer is less than a dielectric constant of the second inner tuning layer.

Embodiment 11

The radome structure of embodiment 10, wherein the first inner tuning layer of the inner tuning layer component comprises a syntactic foam, a polyvinyl chloride (PVC), a plastic closed cell foam, or combinations thereof.

Embodiment 12

The radome structure of embodiment 10, wherein the second inner tuning layer of the inner tuning layer component comprises a syntactic foam, a polyvinyl chloride (PVC), a plastic closed cell foam, or combinations thereof.

Embodiment 13

The radome structure of embodiment 10, wherein the first inner tuning layer has a thickness of at least about 0.1 mm.

Embodiment 14

The radome structure of embodiment 10, wherein the first inner tuning layer has a thickness of not greater than about 6.25 mm.

Embodiment 15

The radome structure of embodiment 10, wherein the second inner tuning layer has a thickness of at least about 0.1 mm.

Embodiment 16

The radome structure of embodiment 10, wherein the second inner tuning layer has a thickness of not greater than about 6.25 mm.

Embodiment 17

The radome structure of any one of embodiments 1 and 2, wherein the first low dielectric constant material has a dielectric constant of not greater than about 3.5.

Embodiment 18

The radome structure of any one of embodiments 1 and 2, wherein the first low dielectric constant material has a dielectric constant of at least about 1.5.

Embodiment 19

The radome structure of any one of embodiments 1 and 2, wherein the first low dielectric constant material comprises polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

Embodiment 20

The radome structure of any one of embodiments 1 and 2, wherein the first high dielectric constant material has a dielectric constant of not greater than about 8.

Embodiment 21

The radome structure of any one of embodiments 1 and 2, wherein the first high dielectric constant material has a dielectric constant of at least about 2.5.

Embodiment 22

The radome structure of any one of embodiments 1 and 2, wherein the first high dielectric constant material comprises glass fibers in a polymer matrix, glass fibers in a polyester matrix, glass fibers in a resin matrix, glass fibers in a cyanate ester matrix or combinations thereof.

Embodiment 23

The radome structure of any one of embodiments 1 and 2, wherein the second low dielectric constant material has a dielectric constant of not greater than about 3.5.

Embodiment 24

The radome structure of any one of embodiments 1 and 2, wherein the second low dielectric constant material has a dielectric constant of at least about 1.5.

Embodiment 25

The radome structure of any one of embodiments 1 and 2, wherein the second low dielectric constant material comprises polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

Embodiment 26

The radome structure of any one of embodiments 1 and 2, wherein the first fiber reinforced dielectric layer has a dielectric constant of not greater than about 3.5.

Embodiment 27

The radome structure of any one of embodiments 1 and 2, wherein the first fiber reinforced dielectric layer has a dielectric constant of at least about 1.5.

Embodiment 28

The radome structure of any one of embodiments 1 and 2, wherein the first fiber reinforced dielectric layer comprises polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

Embodiment 29

The radome structure of any one of embodiments 1 and 2, wherein the second fiber reinforced dielectric layer has a dielectric constant of not greater than about 8.

Embodiment 30

The radome structure of any one of embodiments 1 and 2, wherein the second fiber reinforced dielectric layer has a dielectric constant of at least about 2.5.

Embodiment 31

The radome structure of any one of embodiments 1 and 2, wherein the second fiber reinforced dielectric layer comprises glass fibers in a polymer matrix, glass fibers in a polyester matrix, glass fibers in a resin matrix, glass fibers in a cyanate ester matrix or combinations thereof.

Embodiment 32

The radome structure of any one of embodiments 1 and 2, wherein the third fiber reinforced dielectric layer has a dielectric constant of not greater than about 3.5.

Embodiment 33

The radome structure of any one of embodiments 1 and 2, wherein the third fiber reinforced dielectric layer has a dielectric constant of at least about 1.5.

Embodiment 34

The radome structure of any one of embodiments 1 and 2, wherein the third fiber reinforced dielectric layer comprises polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

Embodiment 35

The radome structure of any one of embodiments 1 and 2, wherein the laminate component further comprises: a fourth fiber reinforced dielectric layer comprising a second high dielectric constant material and overlying the third fiber reinforced dielectric layer; and a fifth fiber reinforced dielectric layer comprising a third low dielectric constant material and overlying the fourth fiber reinforced dielectric layer.

Embodiment 36

The radome structure of embodiment 35, wherein the second high dielectric constant material has a dielectric constant of not greater than about 8.

Embodiment 37

The radome structure of embodiment 35, wherein the second high dielectric constant material has a dielectric constant of at least about 2.5.

Embodiment 38

The radome structure of embodiment 35, wherein the second high dielectric constant material comprises glass fibers in a polymer matrix, glass fibers in a polyester matrix, glass fibers in a resin matrix, glass fibers in a cyanate ester matrix or combinations thereof.

Embodiment 39

The radome structure of embodiment 35, wherein the third low dielectric constant material has a dielectric constant of not greater than about 3.5.

Embodiment 40

The radome structure of embodiment 35, wherein the third low dielectric constant material has a dielectric constant of at least about 1.5.

Embodiment 41

The radome structure of embodiment 35, wherein the third low dielectric constant material comprises polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

Embodiment 42

The radome structure of embodiment 35, wherein the fourth fiber reinforced dielectric layer has a dielectric constant of not greater than about 8.

Embodiment 43

The radome structure of embodiment 35, wherein the fourth fiber reinforced dielectric layer has a dielectric constant of at least about 2.5.

Embodiment 44

The radome structure of embodiment 35, wherein the fourth fiber reinforced dielectric layer comprises glass fibers in a polymer matrix, glass fibers in a polyester matrix, glass fibers in a resin matrix, glass fibers in a cyanate ester matrix or combinations thereof.

Embodiment 45

The radome structure of embodiment 35, wherein the fifth fiber reinforced dielectric layer has a dielectric constant of not greater than about 3.5.

Embodiment 46

The radome structure of embodiment 35, wherein the fifth fiber reinforced dielectric layer has a dielectric constant of at least about 1.5.

Embodiment 47

The radome structure of embodiment 35, wherein the fifth fiber reinforced dielectric layer comprises polyethylene (PE), polypropylene (PP), polytetrafluoroethylene (PTFE), polyamide (PA), polyethylene (PE) fibers, polypropylene (PP) fibers, polytetrafluoroethylene (PTFE) fibers, polyamide (PA) fibers, or combinations thereof.

Embodiment 48

The radome structure of any one of embodiments 1 and 2, wherein the radome structure further comprises a protection layer overlying the laminate component.

Embodiment 49

The radome structure of any one of embodiments 1 and 2, wherein the radome structure further comprises an outer tuning layer component overlying the laminate component.

Embodiment 50

The radome structure of embodiment 49, wherein the outer tuning layer component comprises a syntactic foam, a polyvinyl chloride (PVC), a plastic closed cell foam, or combinations thereof.

Embodiment 51

The radome structure of embodiment 49, wherein the outer tuning layer component has a thickness of at least about 0.1 mm.

Embodiment 52

The radome structure of embodiment 49, wherein the outer tuning layer component has a thickness of not greater than about 12.5 mm.

Embodiment 53

The radome structure of embodiment 49, wherein the outer tuning layer component is a single tuning layer.

Embodiment 54

The radome structure of embodiment 53, wherein the single tuning layer of the outer tuning layer component comprises a syntactic foam, a polyvinyl chloride (PVC), a plastic closed cell foam, or combinations thereof.

Embodiment 55

The radome structure of embodiment 53, wherein the single tuning layer has a thickness of at least about 0.1 mm.

Embodiment 56

The radome structure of embodiment 53, wherein the single tuning layer has a thickness of not greater than about 6.25 mm.

Embodiment 57

The radome structure of embodiment 49, wherein the outer tuning layer component comprises a first outer tuning layer and a second outer tuning layer, wherein the first outer tuning layer is located between the second outer tuning layer and the laminate component, and wherein a dielectric constant of the first outer tuning layer is less than a dielectric constant of the second outer tuning layer.

Embodiment 58

The radome structure of embodiment 57, wherein the first outer tuning layer of the outer tuning layer component comprises a syntactic foam, a polyvinyl chloride (PVC), a plastic closed cell foam, or combinations thereof.

Embodiment 59

The radome structure of embodiment 57, wherein the second outer tuning layer of the outer tuning layer component comprises a syntactic foam, a polyvinyl chloride (PVC), a plastic closed cell foam, or combinations thereof.

Embodiment 60

The radome structure of embodiment 57, wherein the first outer tuning layer has a thickness of at least about 0.1 mm.

Embodiment 61

The radome structure of embodiment 57, wherein the first outer tuning layer has a thickness of not greater than about 6.25 mm.

Embodiment 62

The radome structure of embodiment 57, wherein the second outer tuning layer has a thickness of at least about 0.1 mm.

Embodiment 63

The radome structure of embodiment 57, wherein the second outer tuning layer has a thickness of not greater than about 6.25 mm.

Embodiment 64

The radome structure of embodiment 49, wherein the radome structure further comprises a protection layer overlying the laminate component.

Embodiment 65

The radome structure of any one of the previous embodiments, wherein the radome structure comprises a thickness of at least about 5 mm.

Embodiment 66

The radome structure of any one of the previous embodiments, wherein the radome structure comprises a thickness of at least about 20 mm.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radome structure comprising:
  an inner tuning layer component having a thickness of at least 3.0 mm and not greater than 12.5 mm, wherein the inner tuning layer component comprises a foam layer having a dielectric constant of at least about 1.0 and not greater than about 3.0, wherein the foam layer comprises a polymethacrylimide (PMD), a polycarbonate (PC), a polyetherimide (PED), a polyvinyl chloride (PVC), acrylonitrile butadiene styrene (ABS), or combinations thereof; and
  a laminate component overlying the inner tuning layer component, wherein the laminate component comprises:
    a first fiber reinforced dielectric layer comprising a first low dielectric constant material having a dielectric constant of at least about 1.5 and not greater than about 3.5, and wherein the first fiber reinforced dielectric layer comprises polyethylene (PE), polypropylene (PP), polytetrafluoroethylene (PTFE), polyamide (PA) or any combinations thereof;

a second fiber reinforced dielectric layer comprising a first high dielectric constant material having a dielectric constant of at least about 2.5 and not greater than about 8.75, and overlying the first fiber reinforced dielectric layer, and wherein the second fiber reinforced dielectric layer comprises glass fibers in a polymer matrix; and a third fiber reinforced dielectric layer comprising a second low dielectric constant material having a dielectric constant of at least about 1.5 and not greater than about 3.5, and overlying the second fiber reinforced dielectric layer, and wherein the third fiber reinforced dielectric layer comprises polyethylene (PE), polypropylene (PP), polytetrafluoroethylene (PTFE), polyamide (PA) or any combinations thereof.

2. The radome structure of claim 1, wherein the inner tuning layer component is a single tuning layer.

3. The radome structure of claim 1, wherein the inner tuning layer component comprises a first inner foamed tuning layer and a second inner foamed tuning layer, wherein the second foamed inner tuning layer is located between the first inner foamed tuning layer and the laminate component, and wherein a dielectric constant of the first inner foamed tuning layer is less than a dielectric constant of the second inner foamed tuning layer.

4. The radome structure of claim 1, wherein the laminate component further comprises:

a fourth fiber reinforced dielectric layer comprising a second high dielectric constant material having a dielectric constant of at least about 2.5 and not greater than about 8.75, and overlying the third fiber reinforced dielectric layer; and a fifth fiber reinforced dielectric layer comprising a third low dielectric constant material having a dielectric constant of at least about 1.5 and not greater than about 3.5, and overlying the fourth fiber reinforced dielectric layer.

5. The radome structure of claim 1, wherein the radome structure further comprises a protection layer overlying the laminate component.

6. The radome structure of claim 1, wherein the radome structure further comprises an outer tuning layer component overlying the laminate component.

7. The radome structure of claim 6, wherein the outer tuning layer component comprises a foam layer having a dielectric constant of at least about 1.0 and not greater than about 3.0, wherein the foam layer comprises a polymethacrylimide (PMI), a polycarbonate (PC), a polyetherimide (PEI), a polyvinyl chloride (PVC), acrylonitrile butadiene styrene (ABS), or combinations thereof.

8. The radome structure of claim 6, wherein the outer tuning layer component is a single tuning layer.

9. The radome structure of claim 6, wherein the outer tuning layer component comprises a first outer foamed tuning layer and a second outer foamed tuning layer, wherein the first outer foamed tuning layer is located between the second outer foamed tuning layer and the laminate component, and wherein a dielectric constant of the first outer foamed tuning layer is less than a dielectric constant of the second outer foamed tuning layer.

* * * * *